US008888246B2

(12) United States Patent
Makuta

(10) Patent No.: US 8,888,246 B2
(45) Date of Patent: Nov. 18, 2014

(54) INKJET RECORDING METHOD AND INKJET RECORDING DEVICE

(71) Applicant: FUJIFILM Corporation, Tokyo (JP)

(72) Inventor: Toshiyuki Makuta, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/170,300

(22) Filed: Jan. 31, 2014

(65) Prior Publication Data

US 2014/0232790 A1 Aug. 21, 2014

(30) Foreign Application Priority Data

Feb. 19, 2013 (JP) ................................ 2013-030385

(51) Int. Cl.

| | |
|---|---|
| ***B41J 2/14*** | (2006.01) |
| ***B41J 2/16*** | (2006.01) |
| ***G01D 11/00*** | (2006.01) |
| ***B41J 11/00*** | (2006.01) |

(52) U.S. Cl.

CPC .................................... *B41J 11/002* (2013.01)

USPC ............................................ 347/47; 347/100

(58) Field of Classification Search

None

See application file for complete search history.

(56) References Cited

U.S. PATENT DOCUMENTS

| | | | | |
|---|---|---|---|---|
| 6,467,898 | B2 | 10/2002 | Codos et al. | |
| 6,702,438 | B2 | 3/2004 | Codos et al. | |
| 6,811,239 | B1 | 11/2004 | Salacz | |
| 7,931,827 | B2 | 4/2011 | Schneider et al. | |
| 8,093,311 | B2 | 1/2012 | Noguchi et al. | |
| 8,216,666 | B2 | 7/2012 | Warner et al. | |
| 2005/0116976 | A1 | 6/2005 | Salacz et al. | |
| 2013/0307913 | A1* | 11/2013 | Kawashima et al. | ......... 347/100 |

FOREIGN PATENT DOCUMENTS

JP 2012-158683 A 8/2012

* cited by examiner

*Primary Examiner* — Lisa M Solomon

(74) *Attorney, Agent, or Firm* — Studebaker & Brackett PC

(57) ABSTRACT

An inkjet recording method includes a step of forming an image by imparting an actinic ray curable ink composition containing a pigment, a polyfunctional polymerizable compound in which a content ratio to a total polymerization component is 80% by mass or more and a sensitizer in which a molecular weight is 1,000 or more onto a recording substrate which is an aggregate of a nonabsorbable or a low absorbable fiber material from an inkjet head under the conditions in which an amount of ink droplets is from 25 pl to 200 pl and a distance between the recording substrate and the inkjet head is from 5 mm to 20 mm, and a step of curing the image by irradiating the formed image with an actinic ray under the conditions in which an oxygen partial pressure is $1.5\times10^{-2}$ MPa or less.

15 Claims, 1 Drawing Sheet

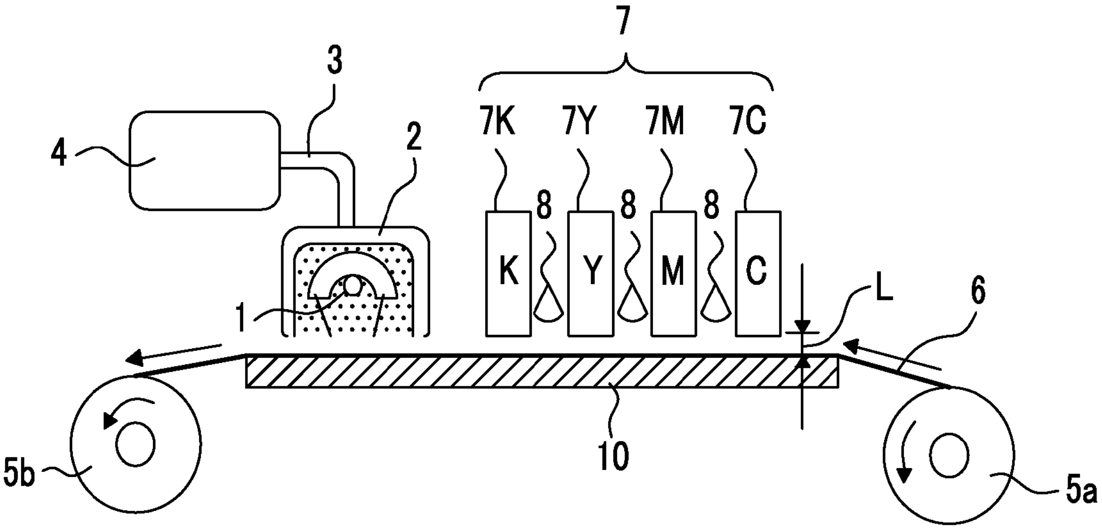
7
3
2
4
7K
7Y
7M
7C
8
8
8
K
Y
M
C
L
6
1
10
5b
5a

INKJET RECORDING METHOD AND INKJET RECORDING DEVICE

BACKGROUND OF THE INVENTION

1. Field of the Invention

The present invention relates to an inkjet recording method and an inkjet recording device.

2. Description of the Related Art

Heretofore, in a case of printing onto a nonwoven fabric used in a diaper (also including disposable pants), training pants, an incontinence underwear for adult, or the like, a conventional printing method such as flexography has been applied. In such a conventional printing method, it is difficult to form an image well on the nonwoven fabric since a plate directly comes into contact with the nonwoven fabric. Therefore, after printing on a polypropylene sheet in advance, placing a polypropylene sheet on the nonwoven fabric was a general method.

However, in a case of producing a product by placing the polypropylene sheet on the nonwoven fabric, this leads to a result in which the breathability possessed by the nonwoven fabric becomes impaired. Therefore, in a case where printing of an image having a large area is performed, it was extremely difficult to ensure the breathability.

As one of the methods to solve such a problem, it is conceivable that an image is directly formed on the nonwoven fabric by an inkjet method (for example, refer to JP4425914B and JP2008-516807A). In the inkjet method, since an image is formed by ink droplets (dot) which has been landed by spraying an ink, it is possible to perform drawing without an inkjet head coming into contact with the nonwoven fabric.

As an example of the ink which is used for the nonwoven fabric, or the like, an aqueous ink has been proposed from the past (for example, refer to JP2006-249203A and JP2011-513049A). The aqueous ink has excellent safety for human bodies, compared with a solvent based ink. Therefore, in respect of the safety, the aqueous ink is suitable for an application of a diaper that may come into contact with the skin, and the like.

On the other hand, a method of adding latex in ink is considered as described in JP2011-513049A, from the viewpoint of improvement of the adhesion of an image to the nonwoven fabric. However, in a case where a step of printing onto the nonwoven fabric is established to a manufacturing line, since an image formation is required generally under 200 m/min to 500 m/min of high-speed transport, from the viewpoint of achieving the high productivity, it is difficult to maintain the high productivity by using the aqueous ink. That is, in a case where the aqueous ink is used, in order to fix an image on the nonwoven fabric, water has to be dried, and thus a large-scale drying device is essential for retaining the high productivity.

In addition, a technology in which an ultraviolet curable ink is used for printing onto a cloth is disclosed (refer to JP2012-158683A, JP2008-533217A and JP2003-508277A). The ultraviolet curable ink can solve the problem of drying in the aqueous ink as described above, that is, requiring a large drying device for drying. In other words, since the ultraviolet curable ink is cured at high-speed by an ultraviolet ray, it is possible to considerably simplify a drying (curing) system.

SUMMARY OF THE INVENTION

However, the ultraviolet curable ink has a property in which an uncured monomer easily remains in the ink when curing, and thus there is a concern that it may not be safe for human bodies. In addition, in the residual monomer in ink, there is a concern in terms of the odor. Such the concerns are potentially more serious in a case where an image is particularly formed on a sanitary product such as a diaper which is worn by a baby.

In addition, in a case of using the nonwoven fabric as a recoding medium, when the nonwoven fabric is transported at high-speed, a travelling path of the nonwoven fabric tends to be largely moved between the inkjet head and the nonwoven fabric, and it is difficult to perform transporting at high-speed and to make the travelling path of the nonwoven fabric stably show a certain position. Therefore, when an image is formed, the nonwoven fabric comes into contact with the inkjet head, and thus this may cause an image to have trouble. On the other hand, if the interval between the inkjet head and the nonwoven fabric is exceedingly separated, the landing accuracy of ink droplets deteriorates as well as the size of ink droplets has to be increased. Therefore, in the related art, the relationship between enhancing the image formation properties onto the nonwoven fabric and adding the high-speed transport properties technically contrary to each other.

The present invention has been made in view of the above, an object thereof is to provide an inkjet recording method in which an image having favorable film strength, excellent rubfastness as well as high safety and weak odor is formed and an inkjet recording device.

In a case where an image is formed on a recording substrate which is an aggregate of a fiber material such as the nonwoven fabric, the findings described below were gained, and the present invention has been achieved based on the findings. That is, (1) the findings in which in a case of setting a nonwoven fabric or the like which is an aggregate of a fiber material to a recording substrate, since the travelling path of the recording substrate is not stable, it is necessary to separate the recording substrate and an inkjet head, in this case, in order to ensure an image having a predetermined quality or more, ink droplets having the predetermined size are required, (2) the findings in which in an application in which a nonwoven fabric or the like is used (for example, a sanitary product such as a diaper), in order to ensure the safety when coming into contact with human bodies (for example, the skin), a polymerizable compound of bifunction or more is effective in terms of reducing the elution as a residual monomer and the elution of a residual alcohol component which is easily contaminated when a monomer is used, (3) the findings in which it is important to perform irradiating with an actinic ray while suppressing the amount of oxygen as much as possible in order to prevent even a trace of elution of a residual monomer or the like, (4) the findings in which changing a low molecular weight sensitizer (example: thioxanthone based compound) which has been widely used in the related art to the predetermined high molecular compound is essential for enhancing the safety.

Specific means for solving the problem described above is shown as follows.

<1> An inkjet recording method includes an image forming step of forming an image by imparting an actinic ray curable ink composition containing a pigment, a polyfunctional polymerizable compound in which a content ratio to a total polymerization component is 80% by mass or more and a sensitizer in which a molecular weight is 1,000 or more onto a recording substrate which is an aggregate of a nonabsorbable or a low absorbable fiber material from an inkjet head under the conditions in which an amount of ink droplets is from 25 pl to 200 pl and a distance between the recording substrate and the inkjet head is from 5 mm to 20 mm, and a curing step of curing the image by irradiating the formed image with an actinic ray under the conditions in which an oxygen partial pressure is $1.5\times10^{-2}$ MPa or less.

<2> The inkjet recording method according to <1>, in which in the image forming step, the actinic ray curable ink composition is imparted at a resolution from 50 dpi (dot per inch) to 400 dpi.

<3> The inkjet recording method according to <1> or <2>, in which in the image forming step, the image is formed onto the recording substrate which is transported at a transport speed of 50 m/min or more.

<4> The inkjet recording method according to any one of <1> to <3>, in which in the image forming step, the image is formed by imparting all ink droplets which has to be imparted in a direction which intersects a transport direction of the recording substrate by discharging once.

<5> The inkjet recording method according to any one of <1> to <4>, in which the fiber material is a polymer fiber.

<6> The inkjet recording method according to any one of <1> to <5>, in which the polyfunctional polymerizable compound is a compound having at least two or more radical polymerizable unsaturated double bonds.

<7> The inkjet recording method according to any one of <1> to <6>, in which the actinic ray curable ink composition further includes a photopolymerization initiator.

<8> The inkjet recording method according to any one of <1> to <7>, in which the amount of ink droplets of the actinic ray curable ink composition is 75 pl or more.

<9> The inkjet recording method according to any one of <2> to <8>, in which the resolution is from 50 dpi to 300 dpi.

<10> The inkjet recording method according to any one of <2> to <9>, in which the resolution is from 50 dpi to 200 dpi.

<11> The inkjet recording method according to any one of <1> to <10>, in which the image forming step includes a pre-curing step of pre-curing a first actinic ray curable ink composition, after a first actinic ray curable ink composition is imparted onto the recording substrate and before a second actinic ray curable ink composition is imparted by using the actinic ray curable ink composition of two or more colors.

<12> An inkjet recording device includes an inkjet head which discharges an actinic ray curable ink composition containing a pigment, a polyfunctional polymerizable compound in which a content ratio to a total polymerization component is 80% by mass or more and a sensitizer in which a molecular weight is 1,000 or more with an amount of ink droplets from 25 pl to 200 pl, transporting means for transporting a recording substrate with a long shape which is an aggregate of a nonabsorbable or a low absorbable fiber material while a distance between the recording substrate and the inkjet head is set to from 5 mm to 20 mm and first irradiating means for irradiating with respect to an image which is formed by the actinic ray curable ink composition which is discharged from the inkjet head with an actinic ray under the conditions in which an oxygen partial pressure is $1.5\times10^{-2}$ MPa or less.

<13> The inkjet recording device according to <12>, in which the inkjet head discharges the actinic ray curable ink composition with the amount of ink droplets of 75 pl or more.

<14> The inkjet recording device according to <12> or <13>, in which the inkjet head has a plurality of nozzles which are arranged with the nozzle density from 50 npi to 400 npi.

<15> The inkjet recording device according to any one of <12> or <14>, in which the inkjet head has a plurality of nozzles which are arranged with the nozzle density from 50 npi to 300 npi.

<16> The inkjet recording device according to any one of <12> or <15>, in which the inkjet head has a plurality of nozzles which are arranged with the nozzle density from 50 npi to 200 npi.

<17> The inkjet recording device according to any one of <12> or <16> includes two or more inkjet heads and second irradiating means for pre-curing the actinic ray curable ink composition between two adjoining inkjet heads between the two adjacent inkjet heads.

<18> The inkjet recording device according to any one of <12> or <17>, in which first irradiating means includes inert gas supplying means for supplying an inert gas and an irradiation chamber in which the oxygen partial pressure is adjusted at $1.5\times10^{-2}$ MPa or less by the inert gas which is supplied from inert gas supplying means and to which the recording substrate is transported.

According to the present invention, an inkjet recording method in which an image having favorable film strength, excellent rubfastness as well as high safety and weak odor is formed and an inkjet recording device are provided.

BRIEF DESCRIPTION OF THE DRAWING

FIG. 1 is an entire configuration diagram schematically illustrating an example of an inkjet recording device for carrying out an inkjet recording method of the present invention.

DESCRIPTION OF THE PREFERRED EMBODIMENTS

Hereinafter, detailed description will be given of an inkjet recording method and an inkjet recording device of the present invention.

<Inkjet Recording Method>

The inkjet recording method of the present invention is configured by providing with at least an image forming step of forming an image by imparting an actinic ray curable ink composition containing a pigment, a polyfunctional polymerizable compound in which the content ratio to the total polymerization component is 80% by mass or more and a sensitizer in which the molecular weight is 1,000 or more onto the recording substrate which is an aggregate of a nonabsorbable or a low absorbable fiber material from the inkjet head under the conditions in which the amount of ink droplets is from 25 pl to 200 pl and the distance between the recording substrate and the inkjet head (hereinafter, also referred to as the "slow distance") is from 5 mm to 20 mm, and a curing step of curing the image by irradiating the formed image with an actinic ray under the conditions in which the oxygen partial pressure is $1.5\times10^{-2}$ MPa or less.

In addition, the inkjet recording method of the present invention may be configured by further providing with other steps such as a pre-curing step of pre-curing the ink composition which is imparted onto the recording substrate, a step of drying the image or a step of heating and fixing the image, as necessary.

In the related art, as to an image formation technology using the inkjet method, various kinds of examinations have been conducted, however, in an application in which an aggregate of a fiber material such as a nonwoven fabric is used as a recording substrate (for example, a sanitary product such as a diaper), in order to ensure the desired image formation properties and not to impair the commercial value, compared with a general image formation technology using plain paper, paper for exclusive use for inkjet, or the like, more advanced conditions are required.

Specifically, in the aqueous ink which is generally used, in order to fix the image on the nonwoven fabric, water has be dried, furthermore, in order to realized high productivity, it is necessary to prepare a large-scale drying device. In addition, since the viscosity of the aqueous ink is generally low, the aqueous ink easily becomes obstructive when transporting at high-speed, moreover, in a case where the nonwoven fabric with a long shape is transported at high-speed, it is difficult to transport at a certain position, therefore, the travelling path is dramatically changed. In order to avoid coming into contact with the head, it is necessary to arrange the nonwoven fabric away from the head, however, in order to ensure the landing position accuracy, the size of ink droplets which are sprayed has to be adjusted to a certain level or more. On the other hand, since it is more difficult to discharge a large amount of ink droplets having low viscosity than the inkjet head, the aqueous ink is unlikely to form droplets in a large volume, and thus, it is disadvantageous to adapt a system in which the gap between the head and the nonwoven fabric has to be widened.

In consideration of this, in the present invention, by using the polymerizable compound of bifunction or more as a curing component configuring the actinic ray curable ink composition and performing irradiation with rays for curing under a low oxygen atmosphere, the residual monomer component and alcohol component which easily remain in the image are reduced as well as by setting the sensitizer for the cure acceleration to a predetermined high molecular compound, the elution of the sensitize also is reduced. In the present invention, since not only the unreacted polymerizable compound is reduced by simply enhancing the curing reactivity, but also the amount of the compound which remains in a state which is easily eluted as an unreacted compound (the state in which all of two or more polymerizable groups do not contribute to the polymerization) is reduced by daringly selecting a polyfunctional compound as a polymerizable compound, moreover, in a case of using, for example, an ester based compound as a polymerizable compound, the amount of alcohol component which does not contribute to the reaction at all and remains among alcohols which react with an acid when an ester is produced is also reduced, the elution of the polymerizable compound and the alcohol component itself which influences the safety is effectively reduced.

In addition, by setting the size of ink droplets to 25 pl or more while retaining a predetermined interval between the recording substrate and the inkjet head, a desired image is steadily formed while avoiding the recording substrate coming into contact with the head.

As stated above, an image having favorable film strength, excellent rubfastness is obtained and the obtained image has excellent safety and odor properties even in an embodiment of use as coming into contact with humans (for example, the skin or the like).

Hereinafter, detailed description will be given of each step configuring the inkjet recording method of the present invention.

—Image Forming Step—

In the image forming step in the present invention, the image is formed by imparting the actinic ray curable ink composition (hereinafter, simply referred to as an “ink composition”) onto the recording substrate which is an aggregate of a nonabsorbable or a low absorbable fiber material from the inkjet head under the following conditions of (1) and (2).

(1) Amount of ink droplets=25 pl to 200 pl (2) Distance of the recording substrate and the inkjet head=5 mm to 20 mm In the step, the actinic ray curable ink composition which is discharged is configured by further using at least a pigment, a polyfunctional polymerizable compound in which the content ratio to the total polymerization component is 80% by mass or more and a sensitizer in which the molecular weight is 1,000 or more and may be configured by further using other components such as a resin component, a organic solvent, other additive agents, as necessary.

Imparting the ink composition onto the recording substrate is performed by the inkjet method using the inkjet head. By using the inkjet method, the ink is selectively imparted in the desired area. The inkjet method is not particularly limited, and any well-known method such as, for example, an electric charge control method of discharging an ink by using electrostatic attraction, a drop-on-demand method (pressure pulse method) of using vibration pressure of piezo elements, a sound inkjet method of discharging an ink by changing an electrical signal into a sound beam, irradiating the ink and using radiation pressure, or a thermal inkjet (bubble jet (registered product)) method of using the pressure that is generated when the ink is heated and bubbles are formed may be used.

In a case of imparting the ink onto the recording substrate, as a method of imparting, a multi-pass or a one-pass (a single-pass) may be used, however, a one-pass (a single-pass) or a two-pass is preferable, from the viewpoint of high-speed recording. Here, a one-pass means a recording method of recording by forming all dots (ink droplets) which have to be formed in a scanning area in the direction by discharging once in terms of the direction which intersects the transport direction of the recording substrate (the array direction of nozzles). In this case, a discharge head (a line head in which the recording elements are arrayed) having the length in accordance with the substrate width length is provided in the substrate width direction which intersects the transport direction of the recording substrate which is transported when recording, and the ink is discharged in the nozzle array direction from a plurality of discharge holes which are provided in the discharge head at the same time. This is called a line method, and it is possible to record the image on the entire surface of the recording substrate by scanning the recording substrate in the direction which intersects the array direction of the recording elements. A transport system such as a carriage as a shuttle method of recording while scanning a short length serial head in the width direction (the main scanning direction) of the recording substrate is not required. In addition, a two-pass means a method of recording by forming dots which are formed in a scanning area by discharging the ink twice.

~Amount of Ink Droplets~

In the image forming step in the present invention, the ink composition is imparted onto the recording substrate with the amount of ink droplets in a range from 25 pl to 200 pl. In a case of increasing the slow distance in order to form the image on the nonwoven fabric, when the size of droplets is less than 25 pl and becomes too small, the discharge direction accuracy of the head deteriorates as well as the landing position accuracy materially deteriorates due to external factors such as wind. In a case of forming the image on the nonwoven fabric, there are few cases having the same landing position accuracy with commercial printing or the like in which the image having high resolution is formed on coated paper or the like is required, however, the amount of ink droplets is set to 25 pl or more, from the viewpoint of ensuring the image forming accuracy to the nonwoven fabric. In addition, being 200 pl of the upper limit value of the amount of ink droplets indicates the image density which is suitable for forming the image having a certain level of resolution.

Among those, as the amount of ink droplets, from 75 pl to 200 pl is further preferable.

~Substrate/Distance Between Heads (Slow Distance)~

In a case of imparting the ink composition onto the recording substrate, the distance between the recording substrate and the inkjet head (the slow distance) is adjusted to a range from 5 mm to 20 mm.

In a case where, for example, the nonwoven fabric which is an aggregate of the fiber material is molded in web-like and transported at high-speed, it is difficult to transport while maintaining the travelling path at a certain position, and a phenomenon in which a track materially moves in between the substrate/the head occurs. However, since this may cause the image formation to have trouble when the head comes into contact with the recording substrate, it is desired to expand the gap (the slow distance) between the inkjet head and the surface of the nonwoven fabric, from the viewpoint of avoiding the contact of the head. When the slow distance is less than 5 mm, in a case of transporting the web-like nonwoven fabric, or the like at high-speed, the recording substrate comes into contact with the head. In addition, when the slow distance exceeds 20 mm and becomes too big, it is possible to avoid the concern of coming into contact with the head; however, the landing position accuracy of ink droplets cannot be ensured.

Among those, as the slow distance in a case of using an aggregate of the fiber material such as the nonwoven fabric as the recording substrate, a range from 10 mm to 20 mm is more preferable.

It is difficult to increase the amount of ink droplets in general due to limitations of the viscosity of the aqueous ink, however, since it is easy to increase the viscosity in the actinic ray curable ink composition in the present invention, ink droplets in which the amount of ink droplets is relatively big are capable of being discharged, and thus the adjustment of the slow distance can be easily performed.

~Resolution~

In a case of forming the image with respect to an aggregate of the fiber material such as the nonwoven fabric, since the image quality having high-definition is not required so much, furthermore, it is necessary to increase the amount of ink droplets, as a resolution of the image (the image density), it is preferable to set to a range from 50 dpi to 400 dpi. When the image is formed at a resolution of 400 dpi or less, it is possible to suppress to small the drying load without imparting the excess ink on the nonwoven fabric, or the like, and thus it is possible to obtain excellent curing properties. Therefore, the amount of the unreacted residual monomer is suppressed to small and the odor properties of the image become favorable. In addition, since the solids are connected when the resolution is 50 dpi or more, the occurrence of a void is prevented. In addition, the desired image concentration is easily obtained.

Among those, for the same reasons described above, more preferred resolution of the image is from 50 dpi to 300 dpi and particularly preferred resolution of the image is from 50 dpi to 200 dpi.

~Pre-Curing Step~

In the image forming step, in a case of forming the image by using the actinic ray curable ink composition of two or more colors, after a first actinic ray curable ink composition is imparted onto the recording substrate and before a second actinic ray curable ink composition is imparted, a step of pre-curing by irradiating the first actinic ray curable ink composition with light (also referred to as a pinning exposure) is preferably provided. The pinning exposure means an exposure method of partially curing the ink composition which is imparted onto the recording substrate with an amount of light that is insufficient to complete curing.

In a case of forming the image having two or more colors, since the viscosity of the ink on the substrate increases by performing the pinning exposure for every single color, it is possible to suppress the occurrence of the so-called color bleeding between the colors.

The exposure amount of the pinning exposure for pre-curing is preferably half or less and further preferably quarter or less, with respect to the exposure amount for regular curing in a curing step described later.

A light source which is used for pre-curing is not particularly limited as long as the light source is one which emits the wavelength light which promotes the polymerization-curing of the ink composition, for example, the same light source as the light source which can be used in the curing step described later can be applied.

(Recording Substrate)

As the recording substrate in the present invention, an aggregate of a nonabsorbable or a low absorbable fiber material is used. The recording substrate indicates a material to be recorded in which the image is recorded by the inkjet method.

Nonabsorbable or low absorbable indicates an absorption degree of the aqueous ink of the recording substrate, however, since the ink is aqueous, it is possible to evaluate as the absorbability of water as describe below. In other words, in the present invention, "nonabsorbable fibers" means fibers consisting of compositions in which the coefficient of water absorption (% by mass, 24 hours) is less than 0.2 by ASTM D570 in ASTM test method, and "low absorbable fibers" means fibers consisting of compositions in which the coefficient of water absorption (% by mass, 24 hours) is 0.2 or more and less than 0.5 by ASTM D570 in ASTM test method.

As the ink nonabsorbable or the low absorbable fiber material, for example, synthetic fibers such as polyolefin fibers (for example, fibers such as polypropylene, polyethylene), polyester fibers (for example, fibers such as polyethylene terephthalate, polyethylene naphthalate), aramid fibers, cellulose fibers, nylon fibers, vinylon fibers, rayon fibers, metallic fibers such as stainless, steel, iron, gold, silver, aluminum, glass fibers (glass wool, or the like), and the like can be included.

As the aggregate of the ink nonabsorbable or the low absorbable fiber material, for example, a nonwoven fabric, a textile, a glass wool, and the like can be included.

The nonwoven fabric means a sheet-like nonwoven fabric which entangles without weaving the fibers and includes a water stream entanglement nonwoven fabric. The nonwoven fabric is a processing sheet, a web or a butt of the fibers which are orientated in one direction or randomly and adhered by friction, cohesiveness, gluing, or the like. The nonwoven fabric dose not include a nonwoven fabric which is weaved or knitted, a nonwoven fabric which is tufted and is subjected to stitch bonding by incorporating the bond of thread or filament, and a nonwoven fabric which is subject to the felt process by a wet milling.

In the present invention, among those mentioned above, the nonwoven fabric is preferable, and the nonwoven fabric of polyolefin fibers is more preferable, from the viewpoint of low cost and favorable workability.

In the recording substrate in the present invention, the diameter (the fiber diameter) of a section perpendicular to the fiber axial direction of the fibers which configure the recording substrate is preferably 1 μm to 200 μm, more preferably 1 μm to 100 μm, and particularly preferably 5 μm to 60 μm. By the fiber diameter being 1 μm or more, it is advantageous, from the viewpoint of the image rub resistance and the hardness of the recording substrate itself, and by being 200 μm or less, it is advantageous, from the viewpoint of the image bleeding or the texture of the recording substrate.

In addition, the thickness of the recording substrate is preferably 1 μm to 1,000 μm, more preferably 1 μm to 800 μm, further preferably 5 μm to 500 μm, and particularly preferably 5 μm to 300 μm. By the thickness being 1 μm or more, it is advantageous, from the viewpoint of the hardness of the recording substrate itself, and by being 1,000 μm or less, it is advantageous, from the viewpoint of the texture of the recording substrate.

The density of the recording substrate (the fiber surface density) is preferably from 1 $g/m^2$ to 300 $g/m^2$, more preferably from 1 $g/m^2$ to 200 $g/m^2$, and particularly preferably from 5 $g/m^2$ to 100 $g/m^2$. By the fiber surface density being 1 $g/m^2$ or more, it is advantageous, from the viewpoint of easily obtaining the image concentration, and by being 300 $g/m^2$ or less, it is advantageous, from the viewpoint of the rubfastness and the image bleeding.

Here, the fiber surface density indicates the ratio [$g/m^2$] of the amount of the fibers which exist on the surface, to the area of the surface on which the fibers are two-dimensionally distributed, and is the value which is determined by cutting the recording substrate per unit area and measuring the weight thereof.

The recording substrate (for example, the nonwoven fabric) may be formed by any method such as melt blowing, span bonding, solvent spinning, electro spinning, or carding.

The recording substrate in the present invention is preferably subjected to a hydrophilic treatment. By being subjected to the hydrophilic treatment, cissing of ink is prevented, and the adhesion of the ink onto the fibers, specifically, the average length of the ink which is adhered in the fiber axial direction can be set to the predetermined range as described later.

At this time, the surface tension of the recording substrate is preferably from $3.4\times10^{-6}$ J to $4.5\times10^{-6}$ J (approximately 34 dyne/cm to 45 dyne/cm), and is more preferably from $3.5\times10^{-6}$ J to $4.0\times10^{-6}$ J (approximately 35 dyne/cm to 40 dyne/cm). The surface tension of the substrate is too small, there are some cases where the adhesion of the image decreases and the surface tension of the substrate is too big, there are some cases where the texture of the recording substrate itself decreases.

Moreover, the surface tension of the recording substrate can be measured the mixed liquid number in which the recording substrate starts to be wet as the surface tension of the substrate by using a mixed liquid for a wet tension test (manufactured by Wako Pure Chemical Industries, Ltd.).

In this case, the surface tension of the ink is preferably in a range from 20 mN/m to 40 mN/m, and in order to adjust the average length of the ink which is adhered in the fiber axial direction described later, it is possible to appropriately select from the range described above. The surface tension of the ink is measured by a Wilhelmy method using a static surface tension measuring device (for example, TD3 manufactured by IKEDA SCIENTIFIC CO., Ltd.).

The hydrophilic treatment includes a corona treatment, a plasma treatment, a flame treatment, a heat treatment, an abrasion treatment, a photo irradiation treatment (an UV treatment), or the like, however, is not limited thereto.

In the present invention, for example, before the aqueous ink is imparted and the image is recorded, the surface of the recording substrate may be subjected to the corona treatment in advance. The corona treatment can increase the surface energy of the substrate and promote the wetness of the substrate surface and the adhesiveness to the substrate. The corona treatment, for example, can be conducted by using Corona master (manufactured by Shinko Electric & Instrumentation Co., Ltd., PS-10S), or the like. The conditions of the corona treatment have to be appropriately selected in accordance with the situations such as the type of the recording substrates or the ink compositions. For example, the conditions may be set to the following treatment conditions.

Treatment voltage: 10 kV to 15.6 kV

Treatment speed: 30 mm/s to 100 mm/s

As the hydrophilic treatment in the present invention, an embodiment in which the corona treatment is conducted is preferable, from the viewpoint of the cost and the workability.

(Actinic Ray Curable Ink Composition)

In the image forming step, the actinic ray curable ink composition which is imparted on the recording substrate includes at least a pigment, a polyfunctional polymerizable compound in which the content ratio to the total polymerization component is 80% by mass or more and a sensitizer in which the molecular weight is 1,000 or more and has the curing reactivity in which the polymerization reaction is occurred by the curing component being cured when irradiating with an actinic ray. By curing, the film strength of the image which is formed on the recording substrate is enhanced and the resistance (rubfastness) to rubbing from the outside is improved.

[Pigment]

The actinic ray curable ink composition in the present invention includes at least one kind of a pigment. By including the pigment, it is possible to form the image having the desired color.

As the pigment, there is no particularly limitation; however, for example, the following organic pigments or inorganic pigments described in the Color Index are included.

As a red or magenta pigment, Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, 88, Pigment Orange 13, 16, 20, 36, and the like are included.

As a blue or cyan pigment, Pigment Blue 1, 15, 15:1, 15:2, 15:3, 15:4, 15:6, 16, 17:1, 22, 27, 28, 29, 36, 60, and the like are included.

As a green pigment, Pigment Green 7, 26, 36, 50, and the like are included.

As a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, 193, and the like are included.

As a black pigment, Pigment Black 7, 28, 26, and the like are included.

As a white pigment, Pigment White 6, 18, 21, and the like are included.

It is preferable that the pigment be moderately dispersed in the ink composition after being added to the ink composition. For the dispersion of the pigment, for example, it is possible to use various dispersion devices such as, for example, a ball mill, a sand mill, an attritor, a roll mill, an agitator, a Henschel mixer, a colloid mill, an ultrasonic homogenizer, a pearl mill, a wet jet mill, and a paint shaker.

The pigment may be added directly with each component during preparation of the ink composition. In addition, in order to improve the dispersibility, after adding to a solvent or a dispersion medium such as the polymerizable compound in advance and uniformly dispersing or dissolving, the pigment can be blended.

It is preferable to set dispersing agents, selection of the dispersion medium, dispersion conditions, and filtration conditions so that the average particle diameter of the pigment particles which are included in the ink composition is preferably 0.005 μm to 0.5 μm, more preferably 0.01 μm to 0.45 μm, further preferably 0.015 μm to 0.4 μm. According to this particle diameter management, clogging of the head nozzle is suppressed, and it is possible to maintain storage stability, transparency and curing sensitivity of the ink composition. According to this particle diameter management, clogging of the head nozzle is suppressed, and it is possible to maintain storage stability, transparency and curing sensitivity of the ink composition.

One kind or two or more kinds of pigments can be appropriately selected and used depending on the intended use of the ink composition, or the like.

The content of the pigment in the ink composition is appropriately selected according to the color and intended purpose; however, is preferably from 0.01% by mass to 30% by mass, with respect to the total ink composition.

The ink composition in the present invention preferably contains a dispersing agent. In particular, in order to stably disperse the pigment in the ink composition, it is preferable that a dispersing agent be contained.

As the dispersing agent, a polymer dispersing agent is preferable. Here, the term "polymer dispersing agent" in the present invention means a dispersing agent in which the weight average molecular weight is 1,000 or more.

As an example of the polymer dispersing agent, DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, DISPERBYK-182 (manufactured by BYK Japan Co., Ltd.); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, EFKA7580 (manufactured by EFKA Additives); DISPERSE AID 6, DISPERSE AID 8, DISPERSE AID 15, DISPERSE AID 9100 (manufactured by SAN NOPCO LIMITED); various SOLSPERSE dispersing agents such as SOLSPERSE 3000, SOLSPERSE 5000, SOLSPERSE 9000, SOLSPERSE 12000, SOLSPERSE 13240, SOLSPERSE 13940, SOLSPERSE 17000, SOLSPERSE 22000, SOLSPERSE 24000, SOLSPERSE 26000, SOLSPERSE 28000, SOLSPERSE 32000, SOLSPERSE 36000, SOLSPERSE 39000, SOLSPERSE 41000 or SOLSPERSE 71000 (manufactured by Noveon); Adeka Pluronic L31, Adeka Pluronic F38, Adeka Pluronic L42, Adeka Pluronic L44, Adeka Pluronic L61, Adeka Pluronic L64, Adeka Pluronic F68, Adeka Pluronic L72, Adeka Pluronic P95, Adeka Pluronic F77, Adeka Pluronic P84, Adeka Pluronic F87, Adeka Pluronic P94, Adeka Pluronic L101, Adeka Pluronic P103, Adeka Pluronic F108, Adeka Pluronic L121, Adeka Pluronic P-123 (manufactured by ADEKA Corporation), Ionet S-20 (manufactured by Sanyo Chemical Industries Ltd.); Disparlon KS-860, 873SN, 874 (polymer dispersing agent), #2150 (aliphatic polyvalent carboxylic acid), #7004 (polyether-ester type) (manufactured by Kusumoto Chemicals, Ltd.), and the like are included.

The content of the dispersing agent in the ink composition has to be appropriately selected according to intended purpose, or the like; however, is preferably from 0.05% by mass to 15% by mass, with respect to the total ink composition.

[Polyfunctional Polymerizable Compound]

The actinic ray curable ink composition in the present invention includes at least one kind of a polyfunctional polymerizable compound. By selecting a polymerizable compound of bifunction or more as a polymerization component, since the amount of the compound which remains in the state which is easily eluted as an unreacted compound due to insufficient polymerization is reduced, moreover, in a case of using, for example, an ester based compound as a polymerizable compound, the amount of alcohol component which does not contribute to the reaction at all and remains out of alcohols which reacts with an acid when an ester is produced is reduced, the elution of the polymerizable compound and the alcohol component which remain in the image is reduced, therefore the safety and the odor properties are dramatically improved.

In the ink composition in the present invention, the content ratio of the polyfunctional polymerizable compound is set to 80% by mass or more, with respect to the total polymerization component. That is to say, the content ratio of the monofunctional polymerizable compound is less than 20% by mass, with respect to the total polymerization component, furthermore, the content ratio of the monofunctional polymerizable compound is preferably less than 10% by mass, and a case where the monofunctional polymerizable is not included is more preferable.

Here, the total polymerization component indicates all compounds having a polymerizable group (for example, unsaturated double bond) which contributes to the curing of the composition by the polymerization reaction occurring by the light irradiation.

In a case where the polymerizable group remains as an unreacted polymerizable group, since the unreacted compound remains in the composition as it is, the monofunctional polymerizable compound is not desired from the viewpoint of the safety and the odor properties. In contrast, in a case of configuring by using the polymerizable compound of bifunction or more, the probability in which no polymerizable groups (example: acrylate group) which exist in a molecule react is extremely low, and thus it is possible to reduce the amount of the polymerizable compound which remains as a monomer or the like in the composition. Furthermore, in a case of a monofunctional monomer, for example, out of the polymerizable compounds, in an ester monomer which is obtained by a monohydric alcohol reacting with acrylic acid or methacrylic acid, there is a case where an unreacted alcohol remains as impurities, and the alcohol component is also one of the causes of the odor. In this point, in a case of a monomer of bifunction or more, because of being obtained by a dihydroxy alcohol or more reacting with acrylic acid or methacrylic acid, the probability of no reaction with acrylic acid or methacrylic acid is extremely low, and thus it is possible to reduce the amount of alcohol which remains in the composition, therefore it is effective to improve the odor properties.

In the ink composition in the present invention, the content ratio of the polyfunctional polymerizable compound is preferably 90% by mass or more, and a case of 100% by mass is more preferable, with respect to the total polymerization component.

As the polyfunctional polymerizable compound, the polyfunctional (meth)acrylate compound is suitably included. The polyfunctional (meth)acrylate compound is a (meth)acrylate compound of bifunction or more, and a (meth)acrylate monomer of bifunction or more and a (meth)acrylate oligomer of bifunction or more are included. Among the (meth)acrylate compound of bifunction or more, a bifunctional acrylate compound is preferable, and diacrylate monomer is particularly preferable.

In the present invention, the monomer is a compound in which the molecular weight is less than 1,000 and the oligomer is generally a polymer in which a finite number (generally 5 to 100) of the monomers are bonded and a compound in which the weight average molecular weight is 1,000 or more.

In addition, the (meth)acrylate monomer means a compound which includes one or more (meth)acryloyloxy groups in a molecule and in which the molecular weight is less than 1,000.

In the present invention, as the molecular weight of the (meth)acrylate monomer, 700 or less is preferable, 500 or less is more preferable, from 226 to 358 is further preferable, and from 242 to 300 is particularly preferable. When the molecular weight is within the range described above, it is possible to achieve both of the prevention of the elution from the image and the suppression of the odor and the reactivity.

As the polyfunctional (meth)acrylate compound, a di(meth)acrylate compound (di(meth)acrylate monomer) in which the number of atoms of the main chain is 8 to 12 is suitably included By including the di(meth)acrylate monomer, the image in which the cross-linking properties are excellent, the elution of the film component to the outside is suppressed, and the adhesion to the substrate is excellent is easily obtained. In addition, the di(meth)acrylate monomer gives moderate flexibility to the cured film, and the viscosity thereof is low as a monomer, therefore it is suitable to give the ink composition having excellent discharge properties.

Among the di(meth)acrylate monomers described above, a compound represented by the following general formula (a-1-1) is preferable.

[Chem. 1]

(a-1-1)

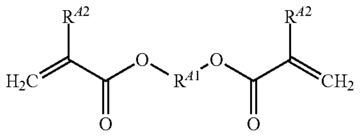

In the general formula (a-1-1), $R^{A1}$ represents a divalent linking group in which the number of atoms of the main chain is 8 to 12 and two $R^{A2}$s each independently represent a hydrogen atom and a methyl group.

"The number of atoms of the main chain" in "a divalent linking group in which the number of atoms of the main chain is 8 to 12" represented by $R^{A1}$ means that the shortest number of atoms which configures the main chain connected with the linking part with two sites of acrylate groups of $R^{A1}$ is 8 to 12. In a case where the main chain has an ether bond (—O—), an oxygen atom which configures an ether bond is also included. The atom of the main chain is preferably a carbon atom or an oxygen atom.

More specifically, in a case where the compound represented by the general formula (a-1-1) is diethylene glycol diacrylate, the number of atoms of the main chain is 5, and in a case of ethylene oxide modified neopentyl glycol diacrylate (both ends ethylene oxide 1 mol modified neopentyl glycol diacrylate), the number of atoms of the main chain is 9.

As $R^{A2}$, a hydrogen atom is preferable. In addition, two $R^{A2}$s may be composed of the same or different groups, however, they are preferably the same, from the viewpoint of synthesis.

As examples of the compound represented by the general formula (a-1-1), ethylene oxide (EO) modified neopentyl glycol di(meth)acrylate (the number of atoms of the main chain=9), propylene oxide (PO) modified neopentyl glycol di(meth)acrylate (the number of atoms of the main chain=9), EO modified hexanediol di(meth)acrylate (the number of atoms of the main chain=9), PO modified hexanediol di(meth)acrylate (the number of atoms of the main chain=9), octane diol di(meth)acrylate, nonanediol di(meth)acrylate (the number of atoms of the main chain=9), decane diol di(meth)acrylate (the number of atoms of the main chain=10), dodecane diol di(meth)acrylate (the number of atoms of the main chain=12), tripropylene glycol di(meth) acrylate (the number of atoms of the main chain=8), triethylene glycol di(meth)acrylate (the number of atoms of the main chain=8), and the like are included. Among those, triethylene glycol diacrylate and PO modified neopentyl glycol diacrylate are preferable, from the viewpoint of the suppression of the elution from the image and the odor and the viewpoint of the flexibility of the cured film.

The compound represented by the general formula (a-1-1) may be used either alone or as a combination of two or more.

The content of the compound represented by the general formula (a-1-1) is preferably from 10% by mass to 80% by mass, more preferably from 15% by mass to 75% by mass, and particularly preferably from 20% by mass to 45% by mass, with respect to the total ink composition.

In addition, as the polyfunctional (meth)acrylate compound, apart from the above, for example, a bifunctional (meth)acrylate monomer such as dipropylene glycol di(meth) acrylate, tetraethylene glycol di(meth)acrylate, neopentyl glycol di(meth)acrylate, 3-methylpentanediol di(meth)acrylate, hexanediol di(meth)acrylate, heptanediol di(meth)acrylate; and a (meth)acrylate compound of trifunction or more such as pentaerythritol tri(meth)acrylate, pentaerythritol tetra (meth)acrylate, dipentaerythritol tetra(meth)acrylate, trimethylolethane tri(meth)acrylate, trimethylol propane tri (meth)acrylate, tetramethylol methane tetra(meth)acrylate, oligoester (meth)acrylate are suitably included.

SR341, SR350, and the like manufactured by Sartomer Co. Inc. are included as an example of the commercial product of a commercially available polyfunctional (meth)acrylate compound.

In the polyfunctional (meth)acrylate monomer, the viscosity as a monomer unit is preferably from 3 mPa·s to 20 mPa·s, and more preferably from 6 mPa·s to 15 mPa·s at 25° C.

As the polyfunctional (meth)acrylate monomer, a bifunctional acrylate monomer is preferable, from the viewpoint of forming a cross-linked structure on the cured film and suppressing the elution from the image and the odor. In a case of including the bifunctional acrylate monomer as the polyfunctional polymerizable compound, the content of the bifunctional acrylate monomer is preferably from 10% by mass to 80% by mass, more preferably from 15% by mass to 75% by mass, and further preferably from 20% by mass to 45% by mass, with respect to the total mass of ink composition.

In addition, in a case of including the (meth)acrylate monomer of trifunction or more as the polyfunctional polymerizable compound, the content of the (meth)acrylate monomer of trifunction or more is preferably 30% by mass or less, more preferably 20% by mass or less, and further preferably 15% by mass or less, with respect to the total ink composition.

In addition, the ink composition may include a monofunctional polymerizable compound (example: (meth)acrylate monomer) described later, and in this case, as the content of the monofunctional polymerizable compound, 60% by mass or less is preferable, and 50% by mass or less is more preferable, with respect to the total ink composition, from the viewpoint of suppressing the elution from the image, the odor and the blocking.

The ink composition in the present invention may include the polyfunctional (meth)acrylate oligomer as a polyfunctional polymerizable compound. The oligomer is a polymer in which a finite number (generally 5 to 100) of the monomers are generally bonded and it is possible to arbitrarily select well-known oligomers having two or more (meth)acryloyloxy groups.

The polyfunctional (meth)acrylate oligomer is a compound which includes at least two (meth)acryloyloxy groups, and among those, the bi- to hexafunctional compound is preferable, the bi- to tetrafunctional compound is more preferable, the bifunctional or trifunctional compound is further preferable, and the bifunctional compound is particularly preferable.

Among the polyfunctional (meth)acrylate oligomers, the polyfunctional acrylate oligomer is preferable.

The weight average molecular weight of the polyfunctional (meth)acrylate oligomer is preferably 1,000 or more, more preferably from 1,000 to 5,000, further preferably from 1,500 4,500, and particularly preferably from 2,000 to 4,000. When the weight average molecular weight is within the range described above, the elution from the cured film (the image) and the odor are effectively prevented.

In addition, in a case where the oligomer has the molecular weight distribution, the component in which the molecular weight is 1,000 or less is preferably 5% by mass or less, with respect to the total polyfunctional (meth)acrylate oligomer, from the viewpoint of preventing the elution from the cured film (image).

As the polyfunctional (meth)acrylate oligomer, oligoester (meth)acrylate is preferable, and among those, urethane (meth)acrylate, polyester (meth)acrylate and epoxy (meth) acrylate are more preferable, and urethane (meth)acrylate is further preferable.

As urethane (meth)acrylate, aliphatic urethane (meth)acrylate and aromatic urethane (meth)acrylate are preferably included, however, aliphatic urethane (meth)acrylate is more preferably included. In addition, urethane (meth)acrylate is preferably urethane (meth)acrylate of tetrafunction or less, and bifunctional urethane (meth)acrylate is more preferable.

By including urethane (meth)acrylate, the ink composition having excellent adhesion of the substrate and excellent curing properties is obtained.

As to the polyfunctional (meth)acrylate oligomer, Oligomer Handbook (Junji FURUKAWA supervision, The Chemical Daily Co., Ltd.) can be also referred.

As the polyfunctional (meth)acrylate oligomer, the commercial products may be used. As an example of the commercial product, the products described below are included.

As urethane (meth)acrylate, for example, R1204, R1211, R1213, R1217, R1218, R1301, R1302, R1303, R1304, R1306, R1308, R1901, R1150, and the like manufactured by DAI-ICHI KOGYO SEIYAKU CO., LTD., EBECRYL series (for example, EBECRYL 230, 270, 4858, 8402, 8804, 8807, 8803, 9260, 1290, 1290K, 5129, 4842, 8210, 210, 4827, 6700, 4450, 220) manufactured by Daicel-Cytec Co., Ltd., NK OLIGO U-4HA, U-6HA, U-15HA, U-108A, U200AX, and the like manufactured by SHIN-NAKAMURA CHEMICAL CO., LTD., and ARONIX M-1100, M-1200, M-1210, M-1310, M-1600, M-1960, and the like manufactured by TOAGOSEI CO., LTD. are included.

As polyester (meth)acrylate, for example, EBECRYL series (for example, EBECRYL770, IRR467, 81, 84, 83, 80, 675, 800, 810, 812, 1657, 1810, IRR302, 450, 670, 830, 870, 1830, 1870, 2870, IRR267, 813, IRR483, 811, and the like) manufactured by Daicel-Cytec Co., Ltd., and ARONIX M-6100, M-6200, M-6250, M-6500, M-7100, M-8030, M-8060, M-8100, M-8530, M-8560, M-9050, and the like manufactured by TOAGOSEI CO., LTD. are included.

In addition, as epoxy (meth)acrylate, for example, EBECRYL series (for example, EBECRYL600, 860, 2958, 3411, 3600, 3605, 3700, 3701, 3703, 3702, 3708, RDX63182, 6040, and the like) manufactured by Daicel-Cytec Co., Ltd., and the like are included.

The polyfunctional (meth)acrylate oligomer may be used either alone or as a combination of two or more.

The content of the polyfunctional (meth)acrylate oligomer is preferably 15% by mass or less and more preferably 10% by mass or less, with respect to the total ink composition.

[Monofunctional Polymerizable Compound]

The actinic ray curable ink composition in the present invention can be configured by using the polyfunctional polymerizable compound described above and the monofunctional polymerizable compound together.

As an example of the monofunctional polymerizable compound, a monofunctional (meth)acrylate compound is suitably included. As the monofunctional (meth)acrylate compound, a compound selected from a group consisting of a monofunctional (meth)acrylate compound having a hydrocarbon group having 9 or 10 carbon atoms in a molecule and a monofunctional (meth)acrylate compound having a aromatic group is preferable.

The monofunctional (meth)acrylate compound having a hydrocarbon group having 9 or 10 carbon atoms in a molecule is more preferably a monofunctional acrylate compound having a hydrocarbon group having 9 or 10 carbon atoms in a molecule. If the compound is used together, since the film strength is enhanced and the migration of a low molecular weight component in the cured film (the image) is suppressed, it is possible to obtain the image having excellent suppression of the elution from the image and the odor.

Generally, the monofunctional (meth)acrylate compound having a hydrocarbon group having 9 or 10 carbon atoms is easily subjected to the polymerization inhibition by oxygen and there are some cases where a problem occurs in terms of the curing properties in the atmosphere. In the present invention, since an actinic ray is irradiated under the low oxygen partial pressure, the degree of the polymerization inhibition by oxygen is low, and thus it is possible to obtain excellent cured characteristics.

Moreover, for example, a dicyclopentenyl group described later has an unsaturated bond in an aliphatic ring, however, due to the extremely low polymerizability, such an unsaturated bond does not apply to a polymerizable group mentioned in the present invention.

Among the monofunctional polymerizable compounds, a compound represented by the following general formula (a-2-1) is preferable.

[Chem. 2]

(a-2-1)

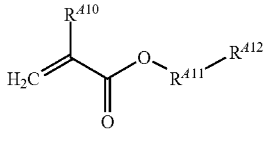

In the general formula (a-2-1), $R^{A10}$ represents a hydrogen atom or a methyl group, $R^{A11}$ resents a single bond or a (poly)alkyleneoxy group, and $R^{A12}$ represents a hydrocarbon group having 9 or 10 carbon atoms.

As $R^{A10}$, a hydrogen atom is preferable.

A "(poly)alkyleneoxy group" represented by $R^{A11}$ represents an alkyleneoxy group or a polyalkyleneoxy group which two or more alkyleneoxy groups are bonded. As an alkyleneoxy group, an ethyleneoxy group or a propyleneoxy group is preferable, and an ethyleneoxy group is more preferable. $R^{A11}$ is particularly preferably a single bond or an ethyleneoxy group.

The hydrocarbon group having 9 or 10 carbon atoms represented by $R^{A12}$ is preferably a cyclic hydrocarbon group. The cyclic hydrocarbon group may be monocycle or polycycle, however, preferably has a polycyclic structure. In addition, the cyclic hydrocarbon group may be a saturated hydrocarbon ring or an unsaturated hydrocarbon ring having an unsaturated bond, and is not particularly limited. Here, the hydrocarbon group having 9 or 10 carbon atoms means not only carbons which forms a ring but also the number of all carbons in $R^{A12}$.

As the compound represented by the general formula (a-2-1), isobornyl (meth)acrylate, 3,3,5-trimethyl cyclohexyl acrylate, 4-t-butyl cyclohexyl (meth)acrylate, dicyclopentanyl oxyethyl(meth)acrylate, dicyclopentanyl (meth)ethyl acrylate, dicyclopentenyloxyethyl (meth)acrylate, dicyclopentenyl (meth)acrylate, and the like are exemplified, and 4-t-butyl cyclohexyl acrylate and dicyclopentenyloxyethyl acrylate are more preferable, from the viewpoint of the odor and the low volatility.

The content of the compound represented by the general formula (a-2-1) is preferably 5% by mass to 50% by mass, more preferably 10% by mass to 45% by mass, and further preferably 15% by mass to 35% by mass, with respect to the total ink composition. If the content of the compound is within the range described above, the image in which the elution amount of the polymerizable compound and the occurrence of the odor are suppressed is obtained.

As the monofunctional (meth)acrylate compound, the monofunctional (meth)acrylate compound having an aromatic group is suitably included. The cyclic structure of an aromatic group of the monofunctional (meth)acrylate compound having an aromatic group may include a heteroatom such as O, N, or S. As the monofunctional (meth)acrylate compound having an aromatic group, a compound represented by the following general formula (a-2-2) is preferable.

[Chem. 3]

(a-2-2)

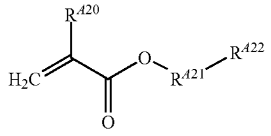

In the compound represented by the general formula (a-2-2), $R^{A20}$ represents a hydrogen atom or a methyl group. $R^{A21}$ represents a single bond, an ether bond (—O—), an ester bond (—C(O)O— or —OC(O)—), an amide bond (—C(O)NH— or —NHC(O)—), a carbonyl bond (—C(O)—), an alkylene group having 20 or less carbon atoms which may have a branch, or a linking group formed by a combination thereof, and is preferably a single bond, or one having a group or a bond selected from a group consisting of an ether group, an ester group and an alkylene group having 20 or less carbon atoms $R^{A22}$ represents an aromatic group containing a monocyclic aromatic group or a polycyclic aromatic group. The cyclic structure of an aromatic group may include a heteroatom such as O, N, or S.

The aromatic group represented by $R^{A22}$ is not particularly limited, however, is preferably a polycyclic aromatic group having 2 to 4 rings in addition to a phenyl group which is a monocyclic aromatic.

As an example of the aromatic group, a naphthyl group, a naphthydiyl group, a naphthytriyl group, an anthryl group, an anthrydiyl group, an anthrytriyl group, a 1H-indenyl group, a 1H-indendiyl group, a 1H-indentriyl group, a 9H-fluorenyl group, a 9H-fluorendiyl group, a 9H-fluorentriyl group, a 1H-phenalenyl group, a 1H-phenalendiyl group, a 1H-phenalentriyl group, a phenanthrenyl group, a phenanthrendiyl group, a phenanthrentriyl group, a triphenylenyl group, a triphenylendiyl group, a triphenylentriyl group, a pyrenyl group, a pyrendiyl group, a pyrentriyl group, a naphthacenyl group, a naphthacendiyl group, a naphthacentriyl group, a tetraphenyl group, a tetraphendiyl group, a tetraphentriyl group, a biphenylenyl group, a biphenylendiyl group, a biphenylentriyl group, an a s-indacenyl group, an a s-indacendiyl group, an a s-indacentriyl group, a s-indacenyl group, a s-indacendiyl group, a s-indacentriyl group, an acenaphthylenyl group, an acenaphthylendiyl group, an acenaphthylentriyl group, a fluoranthenyl group, a fluoranthendiyl group, a fluoranthentriyl group, an acephenantolylenyl group, an acephenantolylendiyl group, an acephenantolylentriyl group, an aceanthrylenyl group, an aceanthrylendiyl group, an aceanthrylentriyl group, a chrysenyl group, a chrysendiyl group, a chrysentriyl group, a pleiadenyl group, a pleiadendiyl group, a pleiadendiyl group, and the like are included.

These aromatic groups may be an aromatic heterocyclic group containing a heteroatom such as O, N, or S. Specifically, the monocyclic aromatic heterocyclic groups such as a fluyl group, a furandiyl group, a furantriyl group, a thiophenyl group, a thiophendiyl group, a thiophentriyl group, a 1H-pyrrolyl group, a 1H-pyrroldiyl group, a 1H-pyrroltriyl group, a 2H-pyrrolyl group, a 2H-pyrroldiyl group, a 2H-pyrroltriyl group, a 1H-pyrazolyl group, a 1H-pyrazoldiyl group, a 1H-pyrazoltriyl group, a 1H-imidazolyl group, a 1H-imidazoldiyl group, a 1H-imidazoltriyl group, an isoxazolyl group, an isoxazoldiyl group, an isoxazoltriyl group, an isothiazolyl group, an isothiazoldiyl group, an isothiazoltriyl group, a 2H-pyranyl group, a 2H-pyrandiyl group, a 2H-pyrantriyl group, a 2H-thiopyranyl group, a 2H-thiopyrandiyl group, a 2H-thiopyrantriyl group, a pyridiyl group, a pyridindiyl group, a pyridintriyl group, a pyridazinyl group, a pyridazindiyl group, a pyridazintriyl group, a pyrimidinyl group, a pyrimidindiyl group, a pyrimidintriyl group, a pyrazinyl group, a pyrazindiyl group, a pyrazintriyl group, a 1,2,3-triazolyl group, a 1,2,3-triazoldiyl group, a 1,2,3-triazoltriyl group, a 1,2,4-triazolyl group, a 1,2,4-triazoldiyl group, or a 1,2,4-triazoltriyl group are included.

In addition, the polycyclic aromatic heterocyclic groups such as a thianthrenyl group, a thianthrendiyl group, a thianthrentriyl group, an isobenzofuranyl group, an isobenzofurandiyl group, an isobenzofurantriyl group, an isochromenyl group, an isochromendiyl group, an isochromentriyl group, a 4H-chromenyl group, a 4H-chromendiyl group, a 4H-chromentriyl group, a xanthenyl group, a xanthendiyl group, a xanthentriyl group, a phenoxathiinyl group, a phenoxathiindiyl group, a phenoxathiintriyl group, an indoliznyl group, an indolizindiyl group, an indolizintriyl group, an isoindolyl group, an isoindoldiyl group, an isoindoltriyl group, an indolyl group, an indoldiyl group, an indoltriyl group, an indazolyl group, an indazoldiyl group, an indazoltriyl group, a purinyl group, a purindiyl group, a purintriyl group, a 4H-quinolizinyl group, a 4H-quinolizindiyl group, a 4H-quinolizintriyl group, an isoquinolyl group, an isoquinolidiyl group, an isoquinolitriyl group, a quinolyl group, a quinolidiyl group, a quinolitriyl group, a phthalazinyl group, a phthalazindiyl group, a phthalazintriyl group, a naphthyridinyl group, a naphthyridindiyl group, a naphthyridintriyl group, a quinoxalinyl group, a quinoxalindiyl group, a quinoxalintriyl group, a quinazolinyl group, a quinazolindiyl group, a quinazolintriyl group, a cinnolinyl group, a cinnolindiyl group, a cinnolintriyl group, a pteridinyl group, a pteridindiyl group, a pteridintriyl group, a carbazolyl group, a carbazoldiyl group, a carbazoltriyl group, a β-carbolinyl group, a β-carbolinediyl group, a β-carbolinetriyl group, a phenanthridinyl group, a phenanthridindiyl group, a phenanthridintriyl group, an acridinyl group, an acridindiyl group, an acridintriyl group, a perimidinyl group, a perimidindiyl group, a perimidintriyl group, a phenanthrolinyl group, a phenanthrolindiyl group, a phenanthrolintriyl group, a phenazinyl group, a phenazindiyl group, a phenazintriyl group, a phenothiazinyl group, a phenothiazindiyl group, a phenothiazintriyl group, a phenoxazinyl group, a phenoxazindiyl group, a phenoxazintriyl group, a pyrrolizinyl group, a pyrrolizindiyl group, or a pyrrolizintriyl group are included.

The aromatic group described above may have one or two or more halogen atoms, hydroxyl groups, amino groups, thiol groups, siloxane groups or substituents having 30 or less carbon atoms. For example, such as phthalic anhydride or a phthalimide anhydride, the cyclic structure including a heteroatom such as O, N, or S may be formed by two or more substituents in which aromatic groups have.

Among those, as the monofunctional (meth)acrylate monomer having an aromatic group, phenoxyethyl (meth) acrylate is particularly preferable and phenoxyethyl acrylate is most preferable.

In addition, as the monofunctional (meth)acrylate compound, a monofunctional (meth)acrylate compound having a long chain alkyl group which has 12 to 18 carbon atoms in a molecule is suitably included. By having a long chain alkyl group which has 12 or more carbon atoms in a molecule, the elution amount is reduced and the odor is suppressed.

As the monofunctional (meth)acrylate compound having a long chain alkyl group which has 12 to 18 carbon atoms in a molecule, a compound represented by the following general formula (a-2-3) is preferable.

[Chem. 4]

(a-2-3)

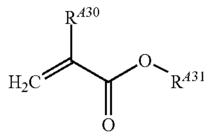

In the general formula (a-2-3), $R^{A30}$ represents a hydrogen atom or a methyl group and $R^{A31}$ represents an alkyl group having 12 to 18 carbon atoms.

As $R^{A30}$, a hydrogen atom is preferable. In addition, an alkyl group having 12 to 18 carbon atoms represented by $R^{A31}$ may be either linear or branched, however, linear is preferable.

As an example of the compound represented by the general formula (a-2-3), lauryl (meth)acrylate, tridecyl (meth)acrylate, and stearyl (meth)acrylate are included.

The compound represented by the general formula (a-2-3) may be used either alone or as a combination of two or more. As the content of the compound represented by the general formula (a-2-3), from 2% by mass to 20% by mass is preferable, and from 3% by mass to 15% by mass is more preferable, with respect to the total ink composition.

Furthermore, as the monofunctional (meth)acrylate compound, other monofunctional (meth)acrylate compounds may be included other than the above.

As other monofunctional (meth)acrylate compound other than the above, an N-vinyl lactam based compound may be included. As the N-vinyl lactam based compound, a compound represented by the following general formula (A) is preferable.

[Chem. 5]

(A)

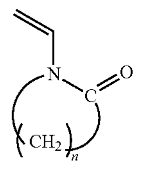

In the general formula (A), n represents an integer of 2 to 6, n is preferably an integer of 3 to 6, n is more preferably 3 or 5, and 5 (that is, N-vinyl caprolactam) is particularly preferable, from the viewpoint of the flexibility after the ink composition is cured, the adhesion with the recording substrate, and the availability of a raw material. N-vinyl caprolactam has excellent safety, is widely used, can be obtained at a relatively low price, and in particular, the favorable curing properties and adhesion to the medium to be recorded of the cured film are obtained, which is therefore preferable.

In addition, the N-vinyl lactam based compound may have a substituent such as an alkyl group or an aryl group on a lactam ring, and may be linked to a saturated or unsaturated ring structure.

The N-vinyl lactam based compound may be used either alone or as a combination of two or more.

The content of the N-vinyl lactam based compound is preferably from 5% by mass to 40% by mass, more preferably from 10% by mass to 35% by mass, and further preferably from 15% by mass to 30% by mass, with respect to the total mass of the ink composition. When the content of the N-vinyl lactam based compound is in the range described above, the image having excellent flexibility is easily obtained.

The ink composition in the present invention may be used other polymerizable compounds other than the above.

As an example of other polymerizable compounds, an unsaturated carboxylic acid such as itaconic acid, crotonic acid, isocrotonic acid or maleic acid, and a salt thereof, an anhydride having an ethylenic unsaturated group, acrylonitrile, and styrene, furthermore, various unsaturated polyesters, unsaturated polyethers, unsaturated polyamides and unsaturated urethane, a (meth)acrylamide compound, and a radical polymerizable compound such as a vinyl ether compound are included.

Furthermore, as other polymerizable compounds, the commercial products or the well-known radical polymerizable or linkable monomers, oligomers and polymers in the industry which are described in "Crosslinking Agent Handbook" edited by shinzo YAMASHITA (1981, TAISEISHA LTD.); "UV•EB Curing Handbook (raw material edition)" edited by kiyomi KATO (1985, the publishing association of polymer); "Application and Market of UV•EB Curing Technology" edited by RadTech Japan, page 79 (1989, CMC Publishing CO., LTD.); "Polyester Resin Handbook" written by eiichiro TAKIYAMA (1988, NIKKAN KOGYO SHIMBUN LTD.), or the like can be used.

The molecular weight of other polymerizable compound is preferably from 80 to 2,000, more preferably from 80 to 1,000, and further preferably from 80 to 800.

In addition, in a case of including other polymerizable compound, the content of other polymerizable compound in the ink composition is preferably from 1% by mass to 40% by mass, more preferably from 3% by mass to 30% by mass, particularly preferably from 5% by mass to 25% by mass, with respect to the total mass of the ink composition.

[Sensitizer]

The actinic ray curable ink composition in the present invention includes at least one kind of a sensitizer in which the molecular weight is 1,000 or more. A low molecular weight compound which is generally used as a sensitizer (for example, a thioxanthone compound such as ITX (isopropyl thioxanthone)) tends to elute from a printed matter into food goods and to be easily contaminated, therefore, a case of applying to a sanitary product such as a diaper in which there is a possibility to come into contact with the skin is also concerned. In a case of using the sensitizer together, by selecting the sensitizer having the large molecular weight, the elution of the sensitizer is suppressed, from the viewpoint of improving the reactivity of the polymerizable compound. In this manner, the image having favorable film strength is realized, as well as the safety and the odor properties of the image are dramatically improved.

As the sensitizer in which the molecular weight is 1,000 or more, a compound represented by the following general formula (1) is preferable.

[Chem. 6]

(1)

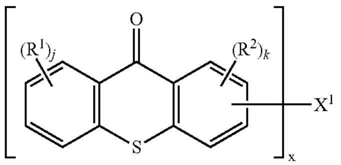

In the general formula (1), $R^1$ and $R^2$ each independently represent an alkyl group having 1 to 5 carbon atoms or a halogen atom, j represents an integer of 0 to 4, k represents an integer of 0 to 3, x represents an integer of 2 to 4, and when j and k are an integer of 2 or more, $R^1$s and $R^2$s which plurally exist may be respectively the same as or different from each other, and $X^1$ represents a x valent hydrocarbon chain having 2 to 300 carbon atoms which may include an ether bond and/or an ester bond.

In the general formula (1), $R^1$ and $R^2$ each independently represent an alkyl group having 1 to 5 carbon atoms or a halogen atom.

The alkyl group having 1 to 5 carbon atoms may be any of linear, branched or cyclic, however, linear or branched is preferable, an alkyl group having 1 to 4 carbon atoms is preferable, an alkyl group having 2 or 3 carbon atoms is more preferable, and an ethyl group or a isopropyl group is further preferable.

As the halogen atom, a fluorine atom, a chlorine atom, a bromine atom and an iodine atom are exemplified and a chlorine atom is preferable.

Among those mentioned above, $R^1$ and $R^2$ particularly preferably an ethyl group, an isopropyl group or a chlorine atom.

In the general formula (1), j represents an integer of 0 to 4, is preferably 0 to 2, and is more preferably 0 or 1. In a case where j is in integer of 2 or more, R's which is in multiple numbers may be composed of the same or different groups.

In the general formula (1), k represents an integer of 0 to 3, is preferably 0 to 2, is more preferably 0 or 1, and is further preferably 0. In a case where k is in integer of 2 or more, $R^2$s which is in multiple numbers may be composed of the same or different groups.

In the general formula (1), x represents an integer of 2 to 4, is more preferably 3 or 4, and is further preferably 4.

In the general formula (1), $X^1$ represents a x valent linking group consisting of a x valent hydrocarbon chain having 2 to 300 carbon atoms which may include an ether bond (—O—) and/or an ester bond (—(C═O)—O—).

Here, in the general formula (1), a plurality (x) of the thioxanthone structures (in the general formula (1) a structure represented by [ ]) excluding $X^1$ which is a linking group are included, however, the thioxanthone structures may be the same as or different from each other and are not particularly limited. From the viewpoint of synthesis, they are preferably the same.

In the compound represented by the general formula (1), a substituted position to thioxanthone is represented as described below.

[Chem. 7]

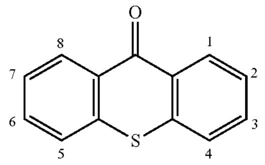

A substituted position of $X^1$ is 1 to 4-position, 2-position, 3-position or 4-position is preferable, 2-position or 4-position is more preferable, and 4-position is further preferable.

A substituted position of $R^1$ is 5 to 8-position, 6-position or 7-position is preferable, and 6-position is more preferable.

In addition, a substituted position of $R^2$ is 1 to 4-position, 1-position, 2-position or 3-position is preferable, and 1-position is more preferable.

The compound represented by the general formula (1) is preferably a compound represented by the following general formula (1').

[Chem. 8]

(1)

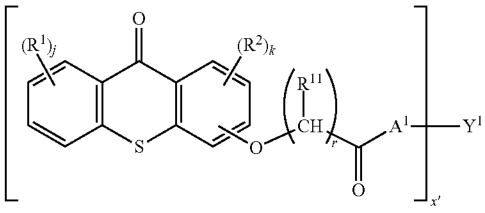

In the general formula (1'), $R^1$, $R^2$, j and k are respectively the same as $R^1$, $R^2$, j and k in the general formula (1) and are also in the same as the preferred range.

In the general formula (1'), $R^{11}$ is each independently represents a hydrogen atom or an alkyl group having 1 to 4 carbon atoms, a hydrogen atom, a methyl group or an ethyl group is preferable, and a hydrogen atom is more preferable.

In the general formula (1'), r each independently represents an integer of 1 to 6, is preferably an integer of 1 to 3, is more preferably 1 or 2, and is further preferably 1. In addition, when the value of r is 2 or more, $R^{11}$s which is in multiple numbers may be composed of the same or different groups.

x' represents an integer of 2 to 4, is preferably 2 or 3, and is further preferably 2.

$Y^1$ represents a residue in which the hydrogen atoms in x of hydroxy groups are removed from a polyhydroxy compound having at least x of hydroxyl groups, and a residue in which hydrogen atoms in all (x) hydroxy groups are removed from a polyhydroxy compound having x of hydroxyl groups is preferable. Specifically, a residue in which hydrogen atoms in x of hydroxy groups are removed from a polyhydroxy compound selected from a group consisting of ethylene glycol, propylene glycol, butylene glycol, glycerin, trimethylolpropane, ditrimethylolpropane and pentaerythritol is preferable, in addition a residue in which hydrogen atoms in all hydroxy groups are removed is preferable.

In the general formula (1'), $A^1$ represents a group selected from a group consisting of (i) to (iii) described above.

[Chem. 9]

$$*\text{—}[O(CHR^{12}CHR^{13})_a]_d\text{—}** \quad (i)$$

$$*\text{—}[O(CH_2)_bCO]_d\text{—}** \quad (ii)$$

$$*\text{—}[O(CH_2)_bCO]_{(d-1)}\text{—}[O(CHR^{12}CHR^{13})_a]\text{—}** \quad (iii)$$

In the general formulae (i) to (iii), either one of $R^{12}$ and $R^{13}$ represents a hydrogen atom, the other represents a hydrogen atom, a methyl group or an ethyl group, a represents an integer of 1 or 2, b represents an integer of 4 or 5, and d represents an integer of 1 to 20 Here, "*" indicates a bond position with a carbonyl carbon and "**" indicates a bond position with $Y^1$.

$A^1$ is preferably a group represented by the general formula (i), and is more preferably $*\text{—}(OCH_2CH_2)_d\text{—}**$, $*\text{—}(OCH_2CH_2CH_2CH_2)_d\text{—}**$, or $*\text{—}O(CH(CH_3)CH_2)_d\text{—}**$. In this case, d is more preferably an integer of 3 to 10.

The molecular weight of the compound represented by the general formula (1) is 1,000 or more. Among those, the molecular weight is preferably from 1,000 to 3,000, more preferably from 1,000 to 2,500, and further preferably from 1,000 to 2,000.

If the molecular weight is less than 1,000, the elution from the cured film is not suppressed and the odor properties also deteriorate. In addition, if the molecular weight is 3,000 or less, a steric hindrance in a molecule is small, furthermore, a degree of freedom in a liquid/film of a molecule is maintained, and thus high sensitivity is obtained.

Here, in a case where the sensitizer is used by mixing a plurality of compounds from which the number of carbons or the like is different, it is preferable that the weight average molecular weight satisfy the range described above.

Hereinafter, specific examples of the compound represented by the general formula (1) are shown, however, the present invention is not limited to these compounds.

[Chem. 10]

I-A

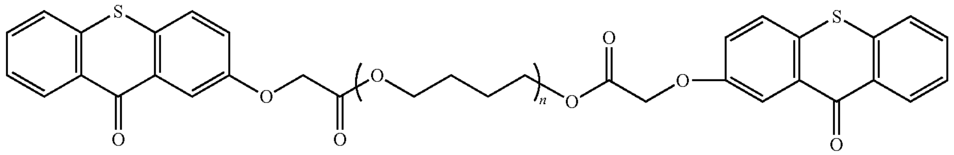

n = 1-20

I-B

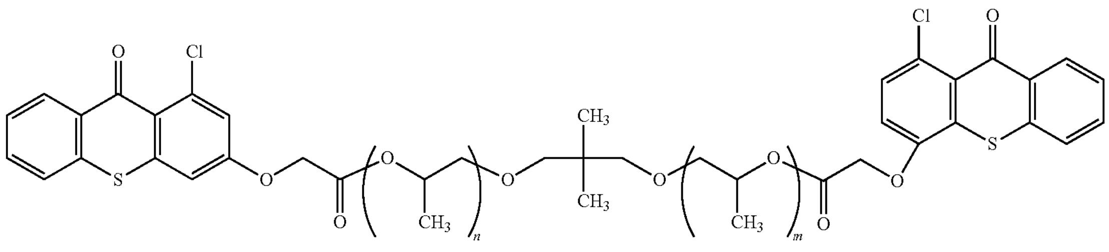

n = 1-20
m = 1-20

I-C

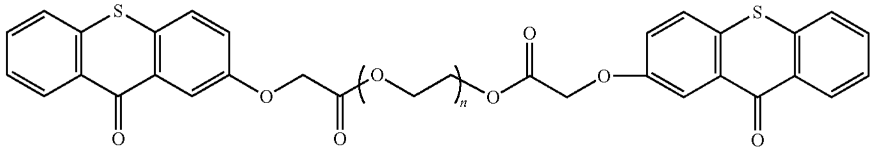

n = 1-20

-continued

[Chem. 11]

I-D

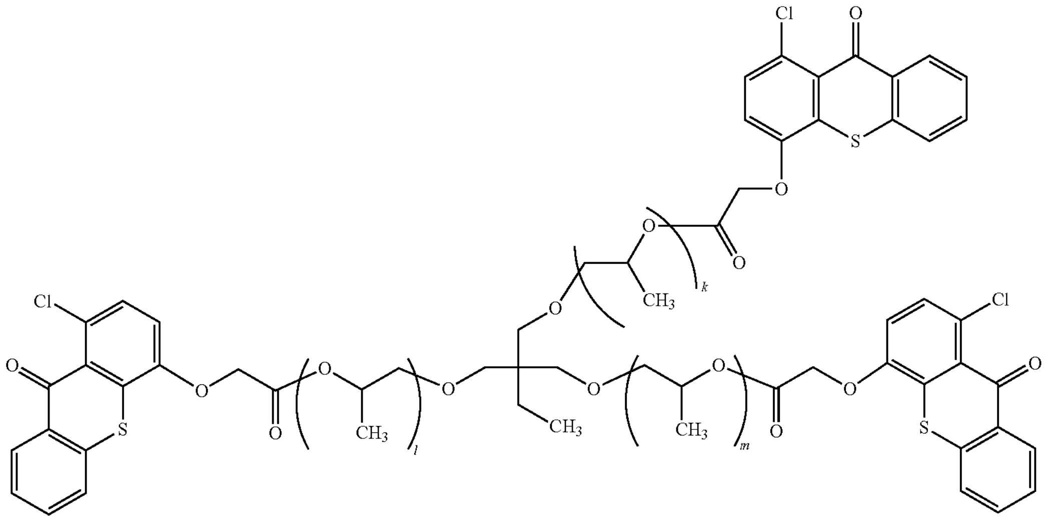

k = 1-20
l = 1-20
m = 1-20

I-E

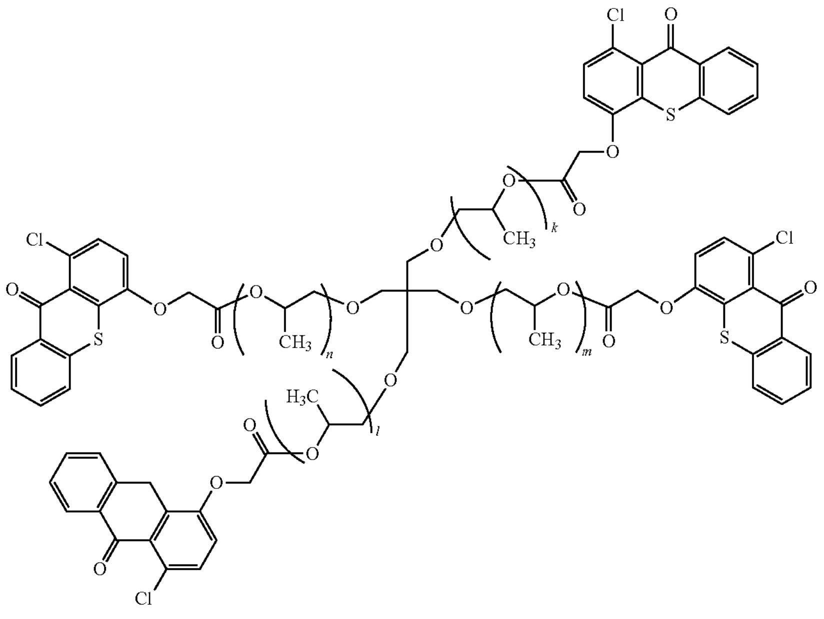

k = 1-20 l = 1-20 m = 1-20 n = 1-20

Among those, the compound (I-A) or (I-E) is preferable, and the compound (I-E) is more preferable.

As the compound represented by the general formula (1), commercially available compounds may be also used. Specifically, Speedcure 7010 (1,3-di({α-[1-chloro-9-oxo-9H-thioxanthen-4-yl]oxy}acetylpoly[oxy(1-methylethylene)])oxy)-2,2-bis({α-[1-chloro-9-oxo-9H-thioxanthen-4-yl]oxy}acetylpoly[oxy(1-methyl ethyl ene)])oxy methyl) propane, CAS No 1003567-83-6), and Omnipol TX (Polybutyleneglycol bis(9-oxo-9H-thioxanthenyloxy)acetate, CAS No. 813452-37-8) are exemplified.

The compound represented by the general formula (1) can be manufactured by a well-known reaction. There is no particularly limitation, however, for example, the compound represented by the general formula (1') can be prepared by the compound represented by the following general formula (1-1) reacting with the compound represented by the following general formula (1-2).

[Chem. 12]

(1-1)

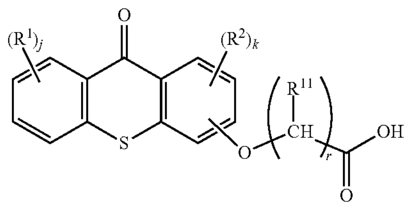

-continued (1-2)

$(H—A^1)_{x'}$—$Y^1$

In the general formula (1-1) and the general formula (1-2), $R^1$, $R^2$, $R^{11}$, $A^1$, $Y^1$, j, k, r and x' are the same as those in the general formula (1') and are also in the same as the preferred range.

The reaction described above is preferably conducted in the presence of a solvent, and as a suitable solvent, an aromatic hydrocarbon such as benzene, toluene or xylene is exemplified.

In addition, the reaction is preferably conducted under the catalytic, and as the catalyst, a sulfonic acid (for example, p-toluenesulfonic acid and methanesulfonic acid), an inorganic acid (for example, sulfuric acid, hydrochloric acid and phosphoric acid), a Lewis acid (aluminum chloride, boron trifluoride and organotitanate), and the like are exemplified.

The reaction temperature and the reaction time are not particularly limited.

After the reaction is finished, a product can be separated by isolating from a reaction mixture by well-known means, and washing and drying, as necessary.

In addition, as the sensitizer, the compound represented by the following general formula (2) is also a preferred compound.

[Chem. 13]

(2)

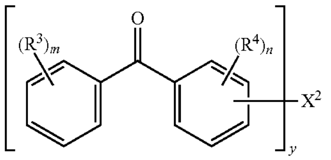

In the general formula (2), $R^3$ and $R^4$ each independently represent an alkyl group having 1 to 5 carbon atoms or a halogen atom, m represents an integer of 0 to 4, n represents an integer of 0 to 3, y represents an integer of 2 to 4, and when m and n are in integer of 2 or more, $R^3$s and $R^4$s which are in multiple numbers may be composed of the same or different groups, and $X^2$ represents a y valent hydrocarbon chain having 2 to 300 carbon atoms which may include an ether bond and/or an ester bond.

In the general formula (2), $R^3$ and $R^4$ each independently represent an alkyl group having 1 to 5 carbon atoms or a halogen atom.

The alkyl group having 1 to 5 carbon atoms may be any of linear, branched or cyclic, however, linear or branched is preferable, an alkyl group having 1 to 4 carbon atoms is preferable, an alkyl group having 2 or 3 carbon atoms is more preferable, and an ethyl group or an isopropyl group is further preferable.

As the halogen atom, a fluorine atom, a chlorine atom, a bromine atom and an iodine atom are exemplified and a chlorine atom is preferable.

Among those, $R^3$ and $R^4$ are particularly preferably an ethyl group, an isopropyl group or a chlorine atom.

In the general formula (2), m represents an integer of 0 to 4, is preferably 0 to 2, and is more preferably 0 or 1. In a case where m is in integer of 2 or more, $R^3$s which is in multiple numbers may be composed of the same or different groups.

In the general formula (2), n represents an integer of 0 to 3, is preferably 0 to 2, is more preferably 0 or 1, and is further preferably 0. In a case where n is in integer of 2 or more, $R^4$s which is in multiple numbers may be composed of the same or different groups.

In the general formula (2), y represents an integer of 2 to 4, is more preferably 2 or 3, and is further preferably 2.

In the general formula (2), $X^2$ represents a y valent linking group consisting of a y valent hydrocarbon chain having 2 to 300 carbon atoms which may include an ether bond (—O—) and/or an ester bond (—(C═O)—O—).

Here, in the general formula (2), a plurality (y) of the benzophenone structures (in the general formula (2), a structure represented by [ ]) excluding $X^2$ which is a linking group are included, however, the benzophenone structures may be the same as or different from each other and are not particularly limited. From the viewpoint of synthesis, they are preferably the same.

In the compound represented by the general formula (2), a substituted position to benzophenone is represented as described below.

[Chem. 14]

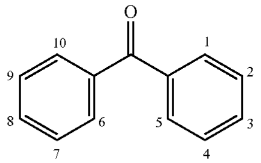

A substituted position of $X^2$ is 1 to 4-position, 2-position, 3-position or 4-position is preferable, 2-position or 4-position is more preferable, and 4-position is further preferable.

A substituted position of $R^3$ is 5 to 8-position, 6-position or 7-position is preferable, and 6-position is more preferable.

In addition, a substituted position of $R^4$ is 1 to 4-position, 1-position, 2-position or 3-position is preferable, and 1-position is more preferable.

The compound represented by the general formula (2) is preferably a compound represented by the following general formula (2').

[Chem. 15]

(2')

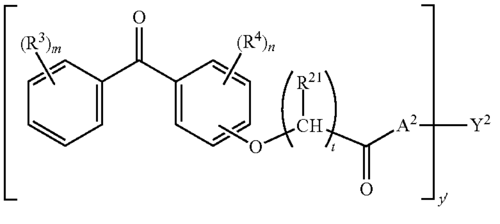

In the general formula (2'), $R^3$, $R^4$, m and n are respectively the same as $R^3$, $R^4$, m and n in the general formula (2) and are also in the same as the preferred range.

In the general formula (2'), $R^{21}$ is each independently represents a hydrogen atom or an alkyl group having 1 to 4 carbon atoms, a hydrogen atom, a methyl group or an ethyl group is preferable, and a hydrogen atom is more preferable.

In the general formula (2'), t each independently represents an integer of 1 to 6, is preferably an integer of 1 to 3, is more preferably 1 or 2, and is further preferably 1. In addition, when the value of t is 2 or more, $R^{21}$s which is in multiple numbers may be composed of the same or different groups.

y' represents an integer of 2 to 4, is preferably 2 or 3, and is further preferably 2.

$Y^2$ represents a residue in which the hydrogen atoms in y's of the hydroxy groups are removed from a polyhydroxy compound having at least y of the hydroxy groups, and a residue in which the hydrogen atoms in all (y) hydroxy groups are removed from a polyhydroxy compound having y of the hydroxy groups is preferable. Specifically, a residue in which the hydrogen atoms in y of the hydroxy groups are removed from a polyhydroxy compound selected from a group consisting of ethylene glycol, propylene glycol, butylene glycol, glycerin, trimethylolpropane, ditrimethylolpropane and pentaerythritol is preferable, furthermore, a residue in which the hydrogen atoms in all hydroxyl groups are removed is preferable.

In the general formula (2'), $A^2$ represents a group selected from a group consisting of the following (i) to (iii).

[Chem. 16]

$$*\text{—}[O(CHR^{12}CHR^{13})_a]_d\text{—}** \quad (i)$$

$$*\text{—}[O(CH_2)_bCO]_d\text{—}** \quad (ii)$$

$$*\text{—}[O(CH_2)_bCO]_{(d-1)}\text{—}[O(CHR^{12}CHR^{13})_a]\text{—}** \quad (iii)$$

In the general formulae (i) to (iii), either one of $R^{12}$ and $R^{13}$ represents a hydrogen atom, the other represents a hydrogen atom, a methyl group or an ethyl group a represents an integer of 1 or 2, b represents an integer of 4 or 5, and d represents an integer of 1 to 20. Here, "*" indicates a bond position with a carbonyl carbon and "**" indicates a bond position with Y'.

$A^2$ is preferably a group represented by the general formula (i), and is more preferably $*\text{—}(OCH_2CH_2)_d\text{—}**$, $*\text{—}(OCH_2CH_2CH_2CH_2)_d\text{—}**$, or $*\text{—}O(CH(CH_3)CH_2)_d\text{—}**$. In this case, d is more preferably an integer of 3 to 10.

The molecular weight of the compound represented by the general formula (2) is 1,000 or more. Among those, the molecular weight is preferably from 1,000 to 3,000, more preferably from 1,000 to 2,500, and further preferably from 1,000 to 2,000.

If the molecular weight is 1,000 or more, the ink composition in which the elution from the cured film is suppressed and the odor properties and blocking are suppressed is obtained. In addition, if the molecular weight is 3,000 or less, a steric hindrance in a molecule is small, furthermore, a degree of freedom in a liquid/film of a molecule is maintained, and thus high sensitivity is obtained.

Here, in a case where the compound represented by the general formula (2) is used as a mixture of a plurality of compounds which have different number of carbons or the like, the weight average molecular weight is preferably in the range described above.

Hereinafter, specific examples of the compounds represented by the general formula (2) are shown, however, the present invention is not limited to these compounds.

[Chem. 17]

I-F

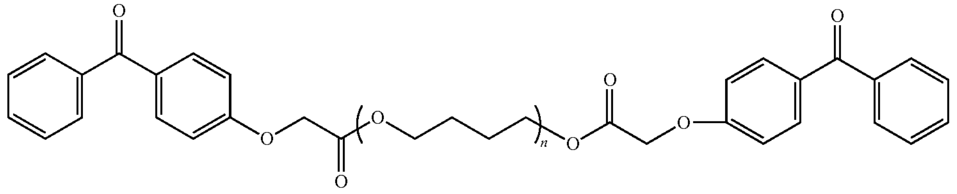

n = 1-20

I-G

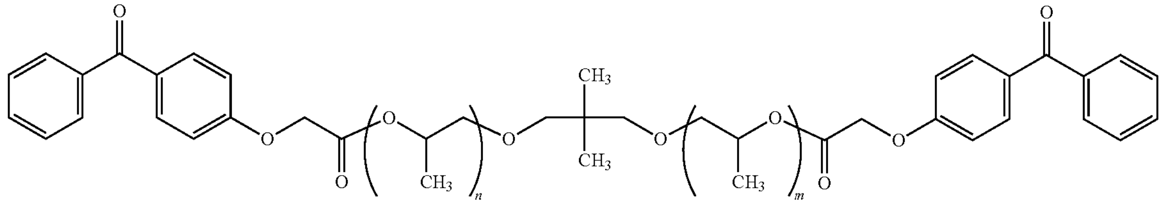

n = 1-20
m = 1-20

I-H

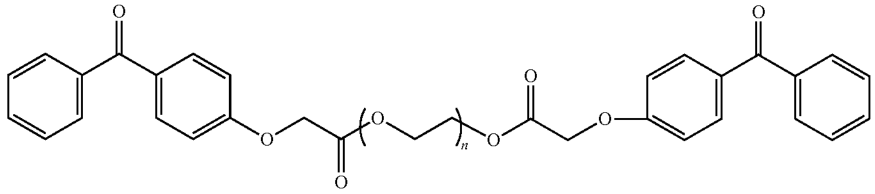

n = 1-20

-continued

[Chem. 18]

I-I

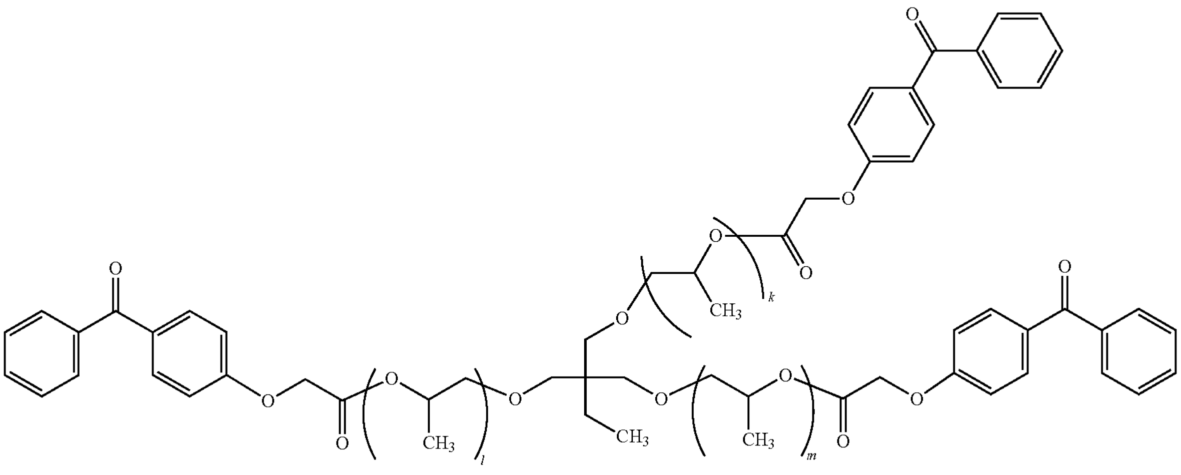

k = 1-20
l = 1-20
m = 1-20

I-J

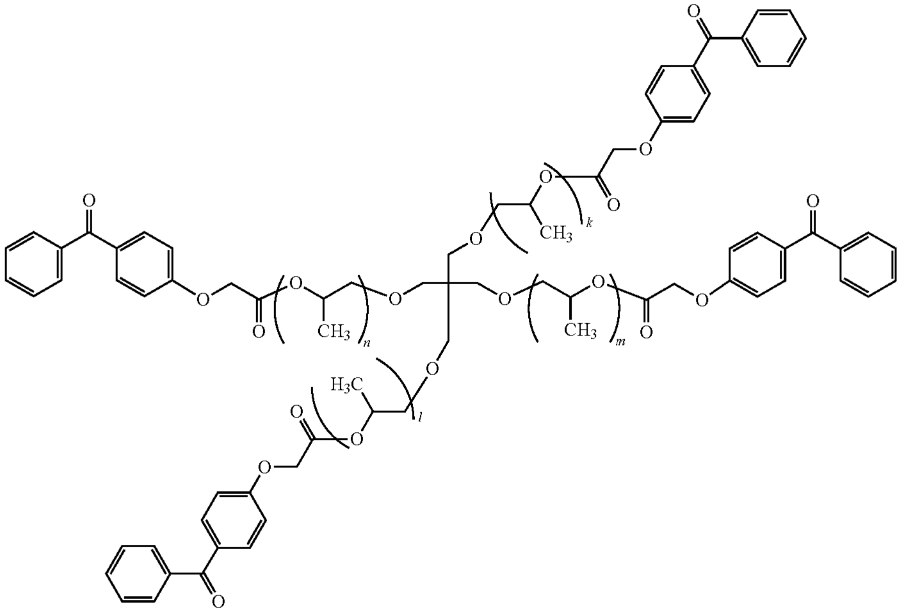

k = 1-20 l = 1-20 m = 1-20 n = 1-20

As the compound represented by the general formula (2), commercially available compounds can be also used. Specifically, for example, Omnipol BP (Polybutyleneglycol bis(4-benzoylphenoxy)acetate, CAS No. 515136-48-8) is exemplified.

The compound represented by the general formula (2) can be manufactured by a well-known reaction. The method of manufacturing is not particularly limited, however, for example, the compound represented by the general formula (2') can be prepared by the compound represented by the following general formula (2-1) reacting with the compound represented by the following general formula (2-2).

[Chem. 19]

(2-1)

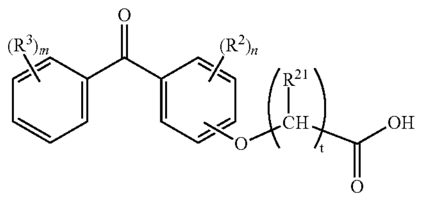

(2-2)

$$(H-A^2)_{y'}-Y^2$$

In the general formula (2-1) and the general formula (2-2), $R^3$, $R^4$, $R^{21}$, $A^2$, $Y^2$, m, n, t and y' are the same as those in the general formula (2') and are also in the same as the preferred range.

The reaction described above is preferably conducted in the presence of a solvent. As a suitable solvent, an aromatic hydrocarbon such as benzene, toluene or xylene is exemplified.

In addition, the reaction is preferably conducted under the catalytic. As the catalytic, a sulfonic acid (for example, p-toluenesulfonic acid and methanesulfonic acid), an inorganic acid (for example, sulfuric acid, hydrochloric acid and phosphoric acid), a Lewis acid (aluminum chloride, boron trifluoride and organotitanate), and the like are exemplified.

The reaction time and the reaction temperature are not particularly limited.

After the reaction is finished, a product can be separated by isolating from a reaction mixture by well-known means, and washing and drying, as necessary.

[Photopolymerization Initiator]

The actinic ray curable ink composition in the present invention preferably includes a photopolymerization initiator. The photopolymerization initiator can be appropriately selected from the compounds which are able to initiate the polymerization reaction of the polymerizable compound by an actinic energy ray. As an example of the polymerization initiator, a photopolymerization initiator which generates an active species (radical, acid, basic, or the like) by an actinic ray such as radiation or light is included.

As an example of the photopolymerization initiator, acetophenone, 2,2-diethoxy acetophenone, p-dimethylaminoacetophenone, p-dimethylaminopropiophenone, benzophenone, 2-chlorobenzophenone, p,p'-dichlorobenzofen, p,p'-bisdiethylaminobenzophenone, Michler's ketone, benzil, benzoin, benzoin methyl ether, benzoin ethyl ether, benzoin isopropyl ether, benzoin n-propyl ether, benzoin isobutyl ether, benzoin n-butyl ether, benzyl dimethyl ketal, tetramethyl thiuram monosulfide, thioxanthone, 2-chlorothioxanthone, 2-methylthioxanthone, azobisisobutyronitrile, benzoin peroxide, di-tert-butyl peroxide, 1-hydroxycyclohexyl phenyl ketone, 1-[4-(2-hydroxyethoxy)-phenyl]-2-hydroxy-2-methyl-1-propane-1-one, 2-hydroxy-2-methyl-1-phenyl-1-one, 1-(4-isopropylphenyl)-2-hydroxy-2-methylpropane-1-one, methyl benzoyl formate are included. Furthermore, for example, an aromatic diazonium salt, an aromatic halonium salt, an aromatic sulfonium salt, a metallocene compound, and the like such as triphenyl sulfonium hexafluorophosphate, diphenyl iodonium hexafluoroantimonate are included.

Other than the above, a bisacylphosphine oxide compound and an α-aminoketone compound are suitably included.

The bisacylphosphine oxide compound is not particularly limited, and a well-known compound can be used, however, the compound represented by the following general formula (b-1) is preferable. The compound is may be used either alone or as a combination of two or more.

[Chem. 20]

(b-1)

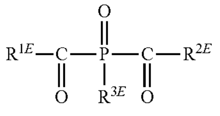

In the general formula (b-1), $R^{1E}$, $R^{2E}$ and $R^{3E}$ each independently represent an aromatic hydrocarbon group which may contain a halogen atom, a methyl group or an ethyl group as a substituent.

Among the well-known bisacylphosphine oxide compounds, for example, the bisacylphosphine oxide compounds disclosed in JP1991-101686A (JP-H03-101686A), JP1993-345790A (JP-H05-345790A), and JP1994-298818A (JP-H06-298818A) are included.

As specific examples, bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl) decylphosphine oxide, bis(2,6-dichlorobenzoyl)-4-octylphenylphosphine oxide, bis(2,4,6-trimethylbenzoyl) phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, bis(2,6-dimethoxybenzoyl)-2,4,4-trimethylpentylphosphine oxide, and the like are included.

Among those, bis(2,4,6-trimethylbenzoyl)phenylphosphine oxide (IRGACURE 819, manufactured by BASF Japan Ltd.) and bis(2,6-dimethoxybenzoyl)-2,4,4-trimethylpentylphenylphosphine oxide are preferable, and bis(2,4,6-trimethylbenzoyl)phenylphosphine oxide is particularly preferable.

The α-aminoketone compound is not particularly limited, and the well-known compounds can be used. Among those, the compound represented by the following general formula (b-2) is preferable. The α-aminoketone compound is may be used either alone or as a combination of two or more.

[Chem. 21]

(b-2)

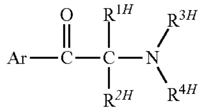

In the general formula (b-2), Ar represents a phenyl group which is substituted with —$SR^{5H}$ or —$N(R^{7H})(R^{8H})$, $R^{5H}$ represents a hydrogen atom or an alkyl group, $R^{1H}$ and $R^{2H}$ each independently represent an alkyl group having 1 to 8 carbon atoms, and $R^{3H}$ and $R^{4H}$ each independently represent a hydrogen atom, an alkyl group having 1 to 12 carbon atoms, an alkyl group having 2 to 4 carbon atoms which is substituted with an alkoxy having 1 to 4 carbon atoms or an alkenyl group having 3 to 5 carbon atoms. $R^{1H}$ and $R^{2H}$ may be bonded to each other to configure an alkylene group having 2 to 9 carbon atoms. $R^{3H}$ and $R^{4H}$ may be bonded to each other to form an alkylene group having 3 to 7 carbon atoms, and the alkylene group may contain —O— or —N($R^{6H}$)— in an alkylene chain. $R^{6H}$ represents an alkyl group having 1 to 4 carbon atoms. $R^{7H}$ and $R^{8H}$ each independently represent a hydrogen atom, an alkyl group having 1 to 12 carbon atoms, an alkyl group having 2 to 4 carbon atoms which is substituted with an alkoxy having 1 to 4 carbon atoms or an alkenyl group having 3 to 5 carbon atoms. $R^{7H}$ and $R^{8H}$ may be bonded to each other to form an alkylene group having 3 to 7 carbon atoms, and the alkylene group may contain —O— or —N($R^{6H}$)— in an alkylene chain. Here, $R^{6H}$ is the same as that described above.

As an example of the α-aminoketone compound, 2-benzyl-2-dimethyl-1-(4-morpholinophenyl)-butanone-1 (Irgacure 369, manufactured by BASF Japan Ltd.) and 2-dimethylamino-2-(4-methylbenzyl)-1-(4-morpholin-4-yl-phenyl)-butan-1-one (Irgacure 379) are included.

In addition, the α-aminoketone compound having high molecular weight is also preferable. Specifically, polyethylene glycol di{β-4-[4-(2-dimethylamino-2-benzyl)butanoylphenyl]piperazine} (Omnipol 910, the average molecular weight: 1032, manufactured by Insight High Technology Co., Ltd.) is included.

In a case of including the photopolymerization initiator, the content of the photopolymerization initiator in the ink composition is preferably from 0.5% by mass to 10% by mass, and more preferably from 1% by mass to 6% by mass, with respect to the total ink composition.

[Resin Component]

The actinic ray curable ink composition in the present invention may include a resin component.

As an example of the resin component, an acrylic based polymer, a polyvinyl butyral resin, a polyurethane resin, a polyamide resin, a polyester resin, an epoxy resin, a phenolic resin, a polycarbonate resin, a polyvinyl butyral resin, a polyvinyl formal resin, a shellac, a vinyl based resin, an acrylic based resin, a rubber based resin, waxes, other natural resins, and the like are included. Among those, a vinyl based copolymer which is obtained by the copolymerization of an acryl based monomer is preferable. Furthermore, as the copolymerization composition of the high molecular compound, a carboxyl group containing monomer, a methacrylic acid alkyl ester, and/or a copolymer which includes a acrylic acid alkyl ester as a monomer unit are also preferably used.

The resin component is may be used either alone or as a combination of two or more.

In a case where the ink composition in the present invention includes the resin component, the content of the resin component is preferably from 0.5% by mass to 20% by mass, and more preferably from 1% by mass to 10% by mass, with respect to the total ink composition.

[Other Components]

The actinic ray curable ink composition in the present invention can be configured by further using other components in addition to the components described above.

Other components include an ultraviolet absorber, an antioxidant, an antifading agent, conductive salts, solvents, a high molecular weight compound, a basic compound, and the like and can be appropriately selected from well-known ones. For example, the components described in JP2009-221416A are included.

In addition, the ink composition in the present invention preferably includes a polymerization inhibitor, from the viewpoint of the storage stability and the suppression of head clogging.

As a polymerization inhibitor, a nitroso based polymerization inhibitor, a hindered amine based polymerization inhibitor, hydroquinone, benzoquinone, p-methoxyphenol, TEMPO, TEMPOL, cupferron A1, and the like are included.

The content of the polymerization inhibitor is preferably from 200 ppm to 20,000 ppm, with respect to the total mass of the ink composition in the present invention.

—Curing Step—

In the curing step in the present invention, the image is cured by irradiating with an actinic ray under the conditions in which the oxygen partial pressure is $1.5\times10^{-2}$ MPa or less with respect to the image which is formed in the image forming step described before.

The reason is that the polymerization initiator which is included in the ink composition of the present invention is decomposed by irradiation with an actinic ray, an polymerization initiation species such as radical is generated, and the polymerization reaction of the polymerizable compound occurs and is promoted by the function of the initiation species. At this time, when the sensitizer is present in the ink composition, the sensitizer in a system becomes an excited state by absorbing an actinic ray, and the decomposition of the polymerization initiator is preferably promoted by coming into contact with the polymerization initiator, therefore the curing reaction can be progressed with even higher sensitivity.

As an active ray, an α ray, a γ ray, an electron beam, an X ray, an ultraviolet ray, visible light, infrared light, and the like are suitable. Depending on the absorption characteristics of the sensitizer, for example, a peak wavelength of an active ray is preferably from 200 nm to 600 nm, more preferably from 300 nm to 450 nm, further preferably from 320 nm to 420 nm, and it is particularly preferred that an active ray be an ultraviolet ray in which a peak wavelength is from 340 nm to 400 nm.

In addition, the illumination of the exposed surface of the ink composition in the present invention is preferably from 10 $mW/cm^2$ to 4,000 $mW/cm^2$, and more preferably from 20 $mW/cm^2$ to 2,500 $mW/cm^2$.

As an actinic ray source, a mercury lamp, a gas or solid laser, and the like are mainly used, and as a light source which is used for curing the ink composition for ultraviolet ray photo curable type inkjet recording, a mercury lamp and a metal halide lamp are widely known. However, mercury-free is currently strongly desired, from the viewpoint of the environmental protection, and it is very useful industrially and environmentally to replace with a GaN based semiconductor ultraviolet light emitting device. Furthermore, an LED (UV-LED) and an LD (UV-LD) are of small-size, long-life, high efficiency and low cost, and are expected as a light source for photo curable type inkjet.

In addition, a light-emitting diode (LED) and a laser diode (LD) can be used as an active ray source. In particular, in a case where an ultraviolet ray source is required, an ultraviolet LED and an ultraviolet LD can be used. For example, NICHIA CORPORATION puts an ultraviolet LED in which the main emission spectrum has a wavelength between 365 nm and 420 nm on the market. In a case where an even shorter wavelength is required, an LED which is centered between 300 nm and 370 nm and can emit an actinic ray is disclosed in U.S. Pat. No. 6,084,250A. In addition, other ultraviolet LEDs are also available, and it is possible to irradiate with radiation in a different ultraviolet band. Particularly preferred actinic ray source in the present invention is an UV-LED, and an UV-LED having a peak wavelength from 340 nm to 400 nm is particularly preferable.

Here, the maximum luminance on a recording medium of an LED is preferably from 10 $mW/cm^2$ to 2,000 $mW/cm^2$, more preferably from 20 $mW/cm^2$ to 1,000 $mW/cm^2$, and particularly preferably from 50 $mW/cm^2$ to 800 $mW/cm^2$.

It is suitable for the ink composition in the present invention to be irradiated with such an actinic energy ray for preferably 0.01 seconds to 120 seconds, and for more preferably 0. 1 second to 90 seconds.

Irradiation conditions and a basic irradiation method of an actinic energy ray are disclosed in JP1985-132767A (JP-S60-132767A). Specifically, the light sources are provided on both sides of a head unit including a discharge device of the ink composition, and the irradiation is performed by scanning the head unit and the light source by a so-called shuttle method. After the ink composition is landed, the irradiation with an actinic energy ray is performed for a certain time (preferably from 0.01 seconds to 0.5 seconds, more preferably from 0.01 seconds to 0.3 seconds, and further preferably from 0.01 seconds to 0.15 seconds). In this manner, by controlling the time from landing to irradiating of the ink composition to a very short time, it becomes possible to prevent bleeding of the ink composition landed on the recording medium before curing. In addition, since it is also possible to exposure with respect to the porous recording medium before the ink composition permeates until the deep part in which the light source does not reach, it is possible to suppress the residues of the unreacted monomer, which is therefore preferable.

Furthermore, the curing may be completed by other light source unaccompanied by a driving. As an irradiation method, for example, a method of using an optical fiber or a method of irradiating a recording unit with UV light by lighting up a mirror surface which is arranged on the side of a head unit by using a collimated light source as described in WO99/54415A can be also applied.

In addition, in the present invention, when irradiating with an actinic ray, an atmosphere around the surface of the medium to be recorded is set to a poor oxygen atmosphere. It is well known that it is possible to decrease energy of an actinic ray which is required for curing by suppressing the oxygen concentration in an atmosphere while curing, however, in the present invention, the elution amount of an unreacted monomer, or the like from the formed image is suppressed, and an improvement in the odor properties is also achieved.

Generally, in a radical polymerization based ink composition, the surface which comes into contact with the air is particularly easily subjected to the inhibition of polymerization by oxygen, and in particular, the insufficient curing of the surface easily occurs. The monomer remains in the film due to the insufficient curing of the surface and the performance of holding the low molecular weight components in the film becomes insufficient due to forming the crosslinked structure of the film by the polyfunctional monomer, therefore, the elution from the image and the odor significantly deteriorate. In the present invention, since a degree of the inhibition of polymerization by oxygen is reduced and the elution amount of the unreacted monomer or the like is suppressed by exposmiting under an environment in which the oxygen concentration is low, it is presumed that the odor is improved.

In the present invention, the irradiation with an actinic ray is performed under a poor oxygen atmosphere in which the oxygen partial pressure is $1.5\times10^{-2}$ MPa or less. Details thereof are as described below.

Since the partial pressure of oxygen is usually $2.1\times10^{-2}$ MPa (atmospheric pressure) under the atmospheric air (one atmospheric pressure), in order to reduce the partial pressure of oxygen to $1.5\times10^{-2}$ MPa or less, it is possible to achieve by (a) reducing the atmospheric air when exposing to set to 0.71 atmospheric pressure or less, or (b) mixing air with 40% by volume or more of gas, except oxygen (for example, an inert gas such as nitrogen or argon), with respect to the air.

The poor oxygen atmosphere in the present invention is not particularly limited, and any method described above can be used.

The oxygen partial pressure is $1.5\times10^{-2}$ MPa or less, preferably $1.0\times10^{-2}$ MPa or less, more preferably $0.8\times10^{-2}$ MPa or less, and particularly preferably $0.5\times10^{-2}$ MPa or less. The lower limit of the oxygen partial pressure is not particularly limited. By evacuating or replacing the atmosphere with gas (for example, nitrogen) except air, it is possible to virtually set the oxygen partial pressure to 0, which is also a preferred method.

The oxygen concentration by the inert gas replacement is preferably controlled to 0.1% to 15% (at this time, the oxygen partial pressure is from $0.1\times10^{-2}$ MPa to $1.5\times10^{-2}$ MPa (from 0.001 atm to 0.15 atm), and more preferably controlled to 0.1% to 10%.

As means of controlling the oxygen concentration of the atmosphere while curing to 0.1% to 15%, for example, there are methods of setting to the nitrogen atmosphere or the carbon dioxide atmosphere by setting an image forming device to a closed system, and the like. As means of supplying nitrogen, for example, there are methods of using a nitrogen gas cylinder or using a device in which only nitrogen gas is separated from the air using the difference of the permeability between oxygen and nitrogen to the hollow fiber membrane. As means of supplying carbon dioxide, there is also a method of supplying using a gas cylinder.

An inert gas means general gases such as $N_2$, $H_2$ or $CO_2$, or rare gases such as He, Ne or Ar. Among these, $N_2$ is suitably used from the reasons of the safety and availability, and the problem of cost.

Under the reduced pressure means a state which is 500 hPa (0.05 MPa) or less, and preferably 100 hPa (0.01 MPa) or less.

<Inkjet Recording Device>

An inkjet recording device in the present invention is configured by including transporting means for transporting the inkjet head which discharges an actinic ray curable ink composition containing a pigment, a polyfunctional polymerizable compound in which the content ratio to the total polymerization component is 80% by mass or more and a sensitizer in which the molecular weight is 1,000 or more with the amount of ink droplets of 25 pl to 200 pl and a recording substrate with a long shape which is an aggregate of a nonabsorbable or a low absorbable fiber material while the distance between the recording substrate and the inkjet head is set to from 5 mm to 20 mm, and first irradiating means for irradiating with respect to the image which is formed by the actinic ray curable ink composition which is discharged from the inkjet head with an actinic ray under the conditions in which the oxygen partial pressure is $1.5\times10^{-2}$ MPa or less. Details of the actinic ray curable ink composition are as described before.

The inkjet recording device of the present invention may be configured by further including other configurations such as a pinning light source for performing the temporary exposure (the pinning exposure) for preventing landing interference, as necessary.

As the inkjet recording device which can be used in the present invention, for example, a device having an ink supply system, a temperature sensor, an actinic energy ray source is included.

The ink supplying system, for example, may be configured by providing with an ink tank accumulating the ink composition in the present invention, an ink supply tube, an ink supply tank right before the inkjet head, a filter, and a piezo type inkjet head.

The inkjet method of forming the image using the inkjet head is not particularly limited, however, a drop-on-demand method (a pressure pulse method) using vibration pressure of a piezo element is preferably used. Here, the inkjet method includes a method of discharging low concentration ink known as photo ink in a small volume many times, a method of improving the image quality using a plurality of inks of different concentrations with substantially the same hue, and a method of using colorless transparent ink.

The inkjet head is preferably an inkjet head which can discharge the actinic ray curable ink composition with the amount of ink droplets of 75 pl or more, from the viewpoint of forming the image on the recording substrate such as a non-woven fabric. Among those, as the amount of ink droplets, from 75 pl to 200 pl is further preferable.

As the inkjet head, a line head in which a plurality of nozzle holes (recording elements) are two-dimensionally arrayed is suitable, and as the nozzle density thereof, from 50 npi to 400 npi is preferable, from 30 npi to 300 npi is more preferable, and from 50 npi to 200 npi is further preferable, from the viewpoint of not generating a void in a solid and reducing drying load. If the nozzle density is smaller than 50 npi, a void is easily generated in a solid part. If the nozzle density is bigger than 400 npi, the amount of the ink which is imparted onto the fiber material becomes too much, and thus the drying load increases.

The inkjet recording device is preferably provided with stabilization means for stabilizing the temperature of the ink composition. The parts which are maintained at a certain temperature are subject to the piping system from the ink tank (an intermediate tank in a case where there is an intermediate tank) up to a nozzle emission surface of the inkjet head and all members. That is, it is possible to insulate and heat from the ink supply tank up to the inkjet head part.

A method of controlling the temperature is not particularly restricted; however, for example, it is preferable to provide a plurality of the temperature sensors on each piping part and perform a heating control in accordance with the flow rate of the ink composition and the environmental temperature. The temperature sensors can be provided in the vicinity of the ink supply tank and the nozzle of the inkjet head. In addition, it is preferable that the head unit to be heated be thermally interrupted or insulated so that the device body is not affected by the temperature from the outside air. In order to shorten the startup time of a printer required for heating, or in order to reduce heat energy loss, it is preferable to insulate from other parts and decrease the heat capacity of the entire heating unit.

As a whole, since the actinic ray curable ink composition has higher viscosity when compared with the aqueous ink which is usually used for an application of an inkjet recording, the viscosity fluctuation due to the temperature fluctuation when discharging is large. The viscosity fluctuation of the ink composition has a considerable effect on the change of the size of droplets and the change of the discharge speed of droplets, eventually, influences the formation properties of the image quality. Therefore, it is important to retain the temperature of the ink composition when discharging constant as much as possible. As the control band of the temperature of the ink composition, ±5° C. of the preset temperature is preferable, ±2° C. of the preset temperature is more preferable, and ±1° C. of the preset temperature is further preferable.

Hereinafter, an example of an inkjet recording device for suitably conducting the inkjet recording method of the present invention is specifically explained in reference to FIG. 1. FIG. 1 is a schematic configuration diagram illustrating a configuration example of the entire inkjet recording device.

As shown in FIG. 1, in the inkjet recording device, an inkjet head unit 7 provided with the inkjet head which serially discharges various ink compositions toward the transport direction (the direction of arrow in FIG. 1) of the recoding medium, a inert gas blanket 2 which is an irradiation chamber provided with an LED light source unit 1 as an example of first irradiating means, and an inert gas generating device 4 which is an example of inert gas supplying means are disposed. In addition, a transport stage 10 which transports the recording substrate is provided in a position facing to the inkjet head unit 7 and the inert gas blanket 2. In the upper stream of the substrate transport direction of the transport stage, a wind-up roll 5*a* in which the recording substrate with a long shape is winded is disposed, and in the lower stream of the substrate transport direction of the transport stage, a wind-up roll 5*b* which winds the recording substrate on which the image is formed is installed.

A recording substrate 6 is supplied to the transport stage 10 from the wind-up roll 5*a*, passes through the inkjet head unit 7, is sent to the inert gas blanket 2 in order, and is finally winded at the wind-up roll 5*b* while transporting at a predetermined transport speed on the transport stage. Here, a form of winding once after forming the image is shown, however, a process such as cutting may be conducted without winding, and, for example, a recording substrate 6 may be finally accumulated or the like as a record of sheet-like or the like.

The recording substrate 6 is stretched to be laid between the wind-up roll 5*a* and 5*b* which are transport means. Out of two wind-up rolls, at least one roller can be set to a driven roller in which the power of the motor (not shown) is transmitted. By rotating the driven roller with a constant rate which rotates by the motor, it is possible to transport the recording substrate in a predetermined direction at a predetermined transport speed.

As the transport speed of transporting the recording substrate, 50 m/min or more is preferable, 100 m/min or more is more preferable, and 200 m/min or more is further preferable.

A transport method may be also employed or used a belt transport method, a stage transport method using stage or the like together, in addition to using the rotational movement of the wind-up roll 5*a* and 5*b*.

In the inkjet head unit 7 in which the inkjet heads which discharge the ink compositions of each color are disposed, the ink compositions of each color (K: black, Y: yellow, M: magenta, C: cyan) are discharged. In the inkjet head unit 7, an inkjet head 7C for cyan ink, an inkjet head 7M for magenta ink, an inkjet head 7Y for yellow ink and an inkjet head 7K for black ink are serially arranged along the substrate transport direction so as to be capable of discharging the inks of four colors.

In addition, each inkjet head is fixed on a blanket which can be expanded or contracted so that the distance to the recording substrate (the distance L in a perpendicular direction in FIGURE) can be adjusted. According to this, the distance L between the inkjet head and the recording substrate can be appropriately changed in accordance with the kind of the recording substrate or the transport speed.

In the present device, the installed number of the inkjet heads is changeable, and 1 to 6 heads can be installed.

In addition, a pinning source light source 8 for performing the pre-exposure (the pinning exposure) and pre-curing the inks which are respectively discharged in the upper stream side is disposed between two inkjet heads disposed in the inkjet head unit 7 as second irradiating means. As the light source, the same ones as the following actinic ray source can be appropriately selected and used.

A light source unit 1 which emits the desired peak wavelength (for example, 385 nm) is installed inside of the inert gas blanket 2 which is an example of the irradiation chamber disposed in the lower stream of the substrate transport direction (the direction of the arrow) of the inkjet head unit 7 as an actinic ray source. The recording substrate on which the image is formed is carried into the irradiation chamber to form a zone for irradiating the image with light. The light source unit 1 is arranged as if being warped by the inert gas blanket 2.

The inert gas blanket 2 is connected to the inert gas generating device 4 through the gas supply pipe 3.

As the actinic ray source, a mercury lamp, a gas or solid laser, and the like are mainly used, and as the light source which is used for curing the ink composition for ultraviolet ray photo curable type inkjet recording, a mercury lamp and a metal halide lamp are widely known. However, mercury-free is currently strongly desired, from the viewpoint of the environmental protection, and it is very useful industrially and environmentally to replace with a GaN based semiconductor ultraviolet light emitting device. Furthermore, an LED (UV-LED) and an LD (UV-LD) are of small-size, long-life, high efficiency, and low cost, and are expected to be a light source for photo curable type inkjet.

The inert gas generating device 4 which is means for setting the atmosphere in the blanket 2 to the poor oxygen atmosphere can supply the inert gas into the inside of the blanket 2 through the gas supply pipe 3. In an initial state, the atmosphere in the blanket 2 is the air, however, by starting and operating the inert gas generating device 4, the inert gas is introduced into the blanket 2 and by replacing the air in the blanket 2 into inert gas, the low oxygen atmosphere (the oxygen partial pressure≤$1.5\times10^{-2}$ MPa) is formed. As inert gas, nitrogen gas is suitably used.

The wind-up roll 5*b* installed in the further lower stream of the inert gas blanket 2 in the substrate transport direction (the direction of the arrow) can wind the recording substrate 6 carried out from the transport stage which the image has been formed.

Example

Hereinafter, the present invention will be even more specifically explained by Examples, however, the present invention is not limited to the following Examples as long as it does not exceed the gist thereof.

<Preparation of Mill Base>

—1. Preparation of Cyan Mill Base A—

300 parts by mass of IRGALITE BLUE GLVO (manufactured by BASF Japan Ltd.: cyan pigment), 590 parts by mass of SR9003 (Propylene oxide (PO) modified neopentyl glycol diacrylate, manufactured by Sartomer Co. Inc.; bifunctional polymerizable compound) and 100 parts by mass of SOLSPERSE 32000 (manufactured by Noveon; dispersing agent) were stirred and mixed to prepare a cyan mill base A.

Here, in the preparation of the cyan mill base A, each component was placed into a disperser motor mill M50 (manufactured by Eiger Corp.), and dispersion was performed for 4 hours at a cycle speed of 9 m/s using zirconia beads of 0.65 mm diameter.

—2. Preparation of Magenta Mill Base B—

300 parts by mass of CINQUASIA MAGENTA RT-355-D (manufactured by BASF Japan Ltd.; magenta pigment), 1035 parts by mass of R341 (3-methyl-1,5-pentanediol diacrylate, manufactured by Sartomer Co. Inc.; bifunctional polymerizable monomer), and 150 parts by mass of EFKA7701 (manufactured by BASF Japan Ltd.; dispersing agent) were stirred and mixed to prepare a magenta mill base B.

Here, in the preparation of the magenta mill base B, each component was placed into a disperser motor mill M50 (manufactured by Eiger Corp.), and dispersion was performed for 4 hours at a cycle speed of 9 m/s using zirconia beads of 0.65 mm diameter.

—3. Preparation of Yellow Mill Base C—

300 parts by mass of NOVOPERM YELLOW H2G (manufactured by Clariant; yellow pigment), 1035 parts by mass of SR341 (3-methyl-1,5-pentanediol diacrylate manufactured by Sartomer Co. Inc.; bifunctional polymerizable monomer), and 150 parts by mass of EFKA7701 (manufactured by BASF Japan Ltd.; dispersing agent) were stirred and mixed to prepare a yellow mill base C.

Here, in the preparation of the yellow mill base C, each component was placed into a disperser motor mill M50 (manufactured by Eiger Corp.), and dispersion was performed for 4 hours at a cycle speed of 9 m/s using zirconia beads of 0.65 mm diameter.

—4. Preparation of Black Mill Base D—

300 parts by mass of SPECIAL BLACK 250 (manufactured by BASF Japan Ltd.; black pigment), 370 parts by mass of SR9003 (PO modified neopentyl glycol diacrylate, manufactured by Sartomer Co. Inc.; bifunctional polymerizable compound) and 75 parts by mass of SOLSPERSE 32000 (manufactured by Noveon; dispersing agent) were stirred and mixed to prepare a black mill base D.

Here, in the preparation of the black mill base D, each component was placed into a disperser motor mill M50 (manufactured by Eiger Corp.), and dispersion was performed for 4 hours at a cycle speed of 9 m/s using zirconia beads of 0.65 mm diameter.

<Preparation of Ink>

By mixing and stirring each component (unit: part by mass) in compositions shown in Table 1 describe below, 1,000 g of a cyan ink C-1, a magenta ink M-1, a yellow ink Y-1 and a black ink K-1 were respectively prepared. In all inks of four colors, the content ratio of the polymerizable compound of bifunction or more accounting for the total polymerization component contained in each ink is 100% by mass. Stirring is performed at room temperature under the conditions of the number of revolution: 5,000 revolution/min and stirring time: 20 minutes using a mixer (L4R, manufactured by Silverson Nippon Ltd.).

Here, the viscosity (mPa·s) in Table 1 was measured under the conditions of 25° C. using VISCOMETER TV-22LT (manufactured by TOKI SANGYOCO. LTD.). In addition, the surface tension (mN/m) was measured under the conditions of 25° C. using AUTOMATIC SURFACE TENSIOMETER CBVP-Z (manufactured by Kyowa Interface Science Co., LTD.).

TABLE 1

| | | C-1 | M-1 | Y-1 | K-1 |
|---|---|---|---|---|---|
| Mill base | Cyan mill base A | 9.5 | | | |
| | Magenta mill base B | | 16.4 | | |
| | Yellow mill base C | | | 10.5 | |
| | Black mill base D | | | | 6 |
| Monomer | SR341 | 74.14 | 76.34 | 74.14 | 74.14 |
| | SR350 | 10 | 1.5 | 9 | 13.5 |
| Initiator | IRGACURE 819 | 4 | 4 | 4 | 4 |
| Sensitizer | Speedcure 7010 | 2 | 1.4 | 2 | 2 |

TABLE 1-continued

| | | C-1 | M-1 | Y-1 | K-1 |
|---|---|---|---|---|---|
| Polymerization inhibitor | FIRSTCURE ST-1 | 0.26 | 0.26 | 0.26 | 0.26 |
| Surfactant | BYK-307 | 0.1 | 0.1 | 0.1 | 0.1 |
| Total | | 100 | 100 | 100 | 100 |
| Viscosity | | 12 | 12 | 12 | 12 |
| Surface tension | | 25 | 25 | 25 | 25 |

Detailed description of components described in Table 1 is shown as below.

SR341 (3-methyl-1,5-pentanediol diacrylate, manufactured by Sartomer Co. Inc.; polymerizable compound)

SR350 (trimethylolpropane triacrylate, manufactured by Sartomer Co. Inc.; polymerizable compound)

IRGACURE 819 (bis(2,4,6-trimethylbenzoyl)phenylphosphine oxide, manufactured by BASF Japan Ltd., the molecular weight 418; photopolymerization initiator)

Speedcure 7010 (compound I-B, manufactured by Lambson Ltd., the molecular weight 1988; sensitizer represented by the general formula (1) described before)

FIRSTCURE ST-1 (a mixture of tris(N-nitroso-N-phenylhydroxylamine)aluminum salt (10% by mass) and phenoxyethylacrylate (90% by mass), manufactured by Chem First; polymerization inhibitor)

BYK307 (silicone-based surfactant, manufactured by BYK-Chemie Japan KK; surfactant)

<Preparation of Recording Substrate>

A polypropylene (PP) nonwoven fabric (the fiber surface density: 30 g/$m^2$, the thickness: 13 μm, the fiber diameter: 20 μm) was prepared and one in which Corona treatment was performed twice under the conditions of the treatment voltage: 14 kV, and the treatment speed: 50 mm/s using Corona master (manufactured by Shinko Electric & Instrumentation Co., Ltd., PS-10S), with respect to the PP nonwoven fabric was used as a recording substrate.

<Preparation of Image Forming Device>

The inkjet recording device having a configuration shown in Table 1 was produced and four inks which were prepared as above were filled into the device.

In an inkjet drawing device produced in present example, as shown in FIG. 1, the wind-up roll 5*a* in which a web-like polypropylene (PP) nonwoven fabric is winded is installed, and as the recording substrate on which the image is formed, the PP nonwoven fabric 6 is sent to the transport stage 10. The PP nonwoven fabric 6 is transported on the transport stage 10 while being winded by the wind-up roll 5*b* capable of driving. In the lower stream of the substrate transport direction of the wind-up roll 5*a*, an inkjet head 7C for cyan ink, an inkjet head 7M for magenta ink, an inkjet head 7Y for yellow ink and an inkjet head 7K for black ink (all are the inkjet head QE 30 manufactured by FUJIFILM Dimatix, Inc., (100 npi (nozzle/inch), capable of discharging 30 pl of ink droplets)) are serially arranged along the substrate transport direction so as to be capable of discharging the inks of four colors. The inkjet head unit 7 in FIG. 1 is configured by four inkjet heads 7C, 7M, 7Y and 7K. Each inkjet head is fixed on a blanket which can be expanded or contracted so that the distance to the recording substrate (the distance in a perpendicular direction in FIGURE) can be adjusted and the distance L between the inkjet head and the recording substrate can be appropriately changed in accordance with the kind of the recording substrate or the transport speed. Here, in the device, the installed number of the heads is changeable, and 1 to 6 heads can be installed.

In addition, the pinning source light source 8 (H-140WLH4-V2-FF1, manufactured by HOYA CANDEO OPTRONICS CORPORATION; second irradiating means) for pre-curing the ink which are discharged in the upper stream side is disposed between each inkjet head (in Examples, a total number of 3 were disposed.)

In the lower stream of the substrate transport direction (the direction of the arrow) of the inkjet head unit 7, the inert gas blanket 2 which is an example of the irradiation chamber for irradiating the image with ultraviolet light after the recording substrate on which the image has been formed is installed is disposed and an LED light source unit (LEDZero Solidcure, manufactured by Integration Technology) 1 having a peak wavelength of 385 nm is installed in the inert gas blanket 2. In addition, the inert gas blanket 2 is connected with $N_2$ gas generating device with a compressor (Maxi-Flow 30, manufactured by In house Gas Ltd.) through the gas supply pipe 3 as an inert gas source which is an example of inert gas supplying means. At this time, the inert gas blanket 2 is connected at 0.2 MPa·s of the pressure.

The wind-up roll 5*b* is installed in the further lower stream of the inert gas blanket 2 in the substrate transport direction (the direction of the arrow) and can wind the PP nonwoven fabric 6 on which the image has been formed.

Here, in the present Example, an example in which the nonwoven fabric on which the image is formed was winded was shown, however, process treatment such as cutting into the desired shape, or the like may be conducted without winding after passing through the inert gas blanket 2, as described above.

In addition, in the inkjet head, QE10 (manufactured by FUJIFILM Dimatix, Inc., 100 npi, capable of discharging 10 pl of ink droplets) and QE80 (manufactured by FUJIFILM Dimatix, Inc., 100 npi, capable of discharging 80 pl of ink droplets) in addition to QE 30 described above were exchanged and used in accordance with an experiment standard.

Example 1

The cyan ink C-1, the magenta ink M-1, the yellow ink Y-1 and the black ink K-1 which were prepared as above were used, and the image was formed under the following conditions by using the inkjet recording device described above. As the image, a solid image of 100% four colors (the ratios of each color are C: 20%, M: 20%, Y: 20% and K: 40%), a solid image of 100% magenta color and a solid image of 100% yellow color were formed.

<Conditions>

(i) Adjust the oxygen partial pressure to the value shown in Table 2 described below by flowing nitrogen gas at a flow rate from 2 L/min to 10 L/min so that $N_2$ gas concentration in the inert gas blanket 2 is in a range from 90% to 99%

(ii) Transport speed of the nonwoven fabric: 200 m/min (iii) Distance between the inkjet head and the nonwoven fabric (the stopped state standard): 10 mm (iv) Amount of ink droplets: 70 pl (v) Resolution of the image: 200 dpi×200 dpi (vi) Pinning light source: light up when drawing Furthermore, in addition to the cyan ink C-1, the magenta ink M-1, the yellow ink Y-1 and the black ink K-1, the cyan inks C-2, C-3, C-4, the magenta inks M-2, M-3, M-4, the yellow inks Y-2, Y-3, Y-4, and the black inks K-2, K-3, K-4 were respectively prepared in the same way as the cyan ink C-1, the magenta ink M-1, the yellow ink Y-1 and the black ink K-1 and the images were formed using these in the same way, except changing SR341 to FA512A described below which is a monofunctional monomer so that the content ratio (100% by mass) of the polymerizable compound of bifunction or more to the total polymerizable compound (monomer) becomes 50%, 70% or 80% (mass ratio) in each ink.

FA512A Dicyclopentadienyl oxyethylacrylate ((Dicyclopentenyloxyethyl acrylate), manufactured by Hitachi Chemical Co., Ltd.)

[Chem. 22]

FA512A

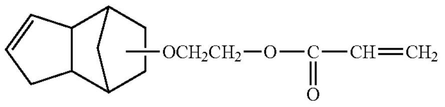

(Evaluation 1)

As to the images which were formed using the cyan inks C-1 to C-4, the magenta inks M-1 to M-4, the yellow inks Y-1 to Y-4, and the black inks K-1 to K-4 described above, the following evaluations were conducted. The evaluation results are shown in Table 2 described below.

(1) Quantitative Determination of Residual Monomer

The solid image of 100% four colors was immersed into a mixed solution of tetrahydrofuran and methanol (THF: MeOH=1:1) and a uncured residual monomer was extracted. Afterward, the quantity of the uncured residual monomer contained in the extraction liquid was determined by liquid chromatography Prominence HPLC system (manufactured by Shimadzu Corporation, column: TSK-gel ODS 100Z (446 mm×150 mm) is installed) and the amount of the residual monomer (% by mass) was calculated by the following expression. The amount of the uncured residual monomer is shown in Table 2 described below (as a monomer, an alcohol body which is not acrylated is also included.). Here, as to the content of the residual monomer, the targeted value was set to 0.1% or less. the amount of the residual monomer (% by mass)=(the amount of the uncured residual monomer/the total amount of the monomer)×100

(2) Odor Properties

As to odor of the solid image of 100% four colors, the sensory evaluation was conducted according to the following evaluation criteria. Specifically, the solid image was connoted in a 30 cm×30 cm of plastic bag with a zipper and left for 24 hours. Afterward, the zipper was released and the evaluation of the odor was conducted. As to the evaluation, the average value which averages out the evaluation values of 10 people (however, an integer which the first figure of decimal position of the average value is rounded off when the average value includes a decimal point) was employed. If the result falls under 1 or 2 of the following evaluation criteria, then there is no issue with the practical use.

<Evaluation Criteria>

1: There is no odor.
2: There is only slight odor but it is barely noticed.
3: There is a certain level of odor but it is not unpleasant level.
4: There is strong odor.

(3) Head Rubbing

As described before, the number of contacts with the head was confirmed when the transport speed was set to 200 m/min and the solid image of 100% four colors was formed, and the evaluation was conducted according to the following evaluation criteria. If the result falls under 1 or 2 of the following evaluation criteria, then there is no issue with the practical use.

<Evaluation Criteria>

1: There is no contact with the head.
2: There is a contact with the head once in a case of transporting for 200 m.
3: The number of contacts with the head which is generated in a case of transporting for 200 m is less than 10.
4: The number of contacts with the head which is generated in a case of transporting for 200 m is 10 or more.

TABLE 2

| | Ink | | | | | |
|---|---|---|---|---|---|---|
| Oxygen partial pressure [MPa] | Kind | Content ratio of polymerizable compound of bifunction or more [mass ratio] | Odor properties | Content ratio of residual monomer [mass ratio] | Rubbing | Notes |
| $10 \times 10^{-2}$ | C-2/M-2/Y-2/K-2 | 50% | 4 | 5% | 4 | Comparative Example |
| $10 \times 10^{-2}$ | C-3/M-3/Y-3/K-3 | 70% | 4 | 3% | 4 | Comparative Example |
| $10 \times 10^{-2}$ | C-4/M-4/Y-4/K-4 | 80% | 4 | 2% | 4 | Comparative Example |
| $10 \times 10^{-2}$ | C-1/M-1/Y-1/K-1 | 100% | 4 | 1% | 4 | Comparative Example |
| $2 \times 10^{-2}$ | C-2/M-2/Y-2/K-2 | 50% | 4 | 4% | 4 | Comparative Example |
| $2 \times 10^{-2}$ | C-3/M-3/Y-3/K-3 | 70% | 4 | 2% | 4 | Comparative Example |
| $2 \times 10^{-2}$ | C-4/M-4/Y-4/K-4 | 80% | 4 | 1% | 4 | Comparative Example |
| $2 \times 10^{-2}$ | C-1/M-1/Y-1/K-1 | 100% | 4 | 0.50% | 4 | Comparative Example |
| $1.5 \times 10^{-2}$ | C-2/M-2/Y-2/K-2 | 50% | 4 | 3% | 4 | Comparative Example |
| $1.5 \times 10^{-2}$ | C-3/M-3/Y-3/K-3 | 70% | 3 | 0.20% | 3 | Comparative Example |
| $1.5 \times 10^{-2}$ | C-4/M-4/Y-4/K-4 | 80% | 2 | 0.01% | 2 | Present invention |

TABLE 2-continued

| Oxygen partial pressure [MPa] | Ink: Kind | Ink: Content ratio of polymerizable compound of bifunction or more [mass ratio] | Odor properties | Content ratio of residual monomer [mass ratio] | Rubbing | Notes |
|---|---|---|---|---|---|---|
| $1.5 \times 10^{-2}$ | C-1/M-1/Y-1/K-1 | 100% | 1 | Not detected | 1 | Present invention |
| $1 \times 10^{-2}$ | C-2/M-2/Y-2/K-2 | 50% | 4 | 2% | 4 | Comparative Example |
| $1 \times 10^{-2}$ | C-3/M-3/Y-3/K-3 | 70% | 3 | 1% | 3 | Comparative Example |
| $1 \times 10^{-2}$ | C-4/M-4/Y-4/K-4 | 80% | 2 | 0.01% | 2 | Present invention |
| $1 \times 10^{-2}$ | C-1/M-1/Y-1/K-1 | 100% | 1 | Not detected | 1 | Present invention |

As shown in Table 2, in the present invention, by polymerizing the predetermined ink under the predetermined oxygen partial pressure (≤$1.5\times10^{-2}$ MPa or less), the odor properties, the amount of the residual monomer and the rubfastness were excellent. In contrast, in Comparative Examples, the odor properties, the amount of the residual monomer and the rubfastness were debased.

Example 2

The cyan ink C-1, the magenta ink M-1, the yellow ink Y-1 and the black ink K-1 which were prepared in Example 1 and the inkjet recording device were used, the amount of ink droplets of the ink which was discharged and the distance between the inkjet head and the nonwoven fabric (the stopped state standard; =the slow distance) were changed as shown in Table 3 described below, and the image was formed under the following conditions. As the images, the solid image of 100% four colors (the ratios of each color are C: 20%, M: 20%, Y: 20% and K: 40%) and the solid image of 100% magenta color were formed in the same way as Example 1.

<Conditions>

(i) Amount of ink droplets and the inkjet head

When the amount of ink droplets=10 pl, the inkjet head QE-10 is used.

When the amount of ink droplets=20 pl, the inkjet head QE-10 is used and the ink is discharged by a multidrop method.

When the amount of ink droplets=30 pl, the inkjet head QE-30 is used.

When the amount of ink droplets=80 pl, the inkjet head QE-80 is used.

(ii) Slow distance: adjust by vertically moving the fixed position of the head (iii) Transport speed of the nonwoven fabric: 200 m/min (iv) Oxygen partial pressure: adjust to $1\times10^{-2}$ MPa (v) Resolution of the image: 200 dpi×200 dpi (vi) Pinning light source: light up when drawing (Evaluation 2)

As to the images formed using the cyan ink C-1, the magenta ink M-1, the yellow ink Y-1 and the black ink K-1 described above, the following evaluations were conducted. The evaluation results are shown in Table 3 described below.

Here, the evaluation of head rubbing was conducted in the same way as Example 1.

(4) Line Quality

In a black image, the quality of lines in the array direction of the nozzle of the head and lines in the vertical direction thereof was evaluated according to the following evaluation criteria. Specifically, the evaluation was conducted by measuring how many portions were found broken in 2.54 cm (1 inch) of line. If the result falls under 1 or 2 of the following evaluation criteria, then there is no issue with the practical use.

<Evaluation Criteria>

1: The portions which are broken are not found and the line quality is excellent.

2: The portions which are broken are found but are less than 5 portions.

3: 5 or more portions which are broken are found.

4: The lines cannot be formed.

TABLE 3

| Amount of ink droplets [pl] | Slow distance | Line quality | Head rubbing | Notes |
|---|---|---|---|---|
| 10 | 1 mm | 1 | 4 | Comparative Example |
| 10 | 4 mm | 3 | 3 | Comparative Example |
| 10 | 5 mm | 4 | 2 | Comparative Example |
| 10 | 10 mm | 4 | 1 | Comparative Example |
| 10 | 20 mm | 4 | 1 | Comparative Example |
| 10 | 25 mm | 4 | 1 | Comparative Example |
| 20 | 5 mm | 4 | 1 | Comparative Example |
| 30 | 1 mm | 1 | 4 | Comparative Example |
| 30 | 4 mm | 1 | 3 | Comparative Example |
| 30 | 5 mm | 2 | 2 | Present invention |
| 30 | 10 mm | 2 | 1 | Present invention |
| 30 | 20 mm | 2 | 1 | Present invention |
| 30 | 25 mm | 4 | 1 | Comparative Example |
| 80 | 1 mm | 1 | 4 | Comparative Example |

TABLE 3-continued

| Amount of ink droplets [pl] | Slow distance | Line quality | Head rubbing | Notes |
|---|---|---|---|---|
| 80 | 4 mm | 1 | 3 | Comparative Example |
| 80 | 5 mm | 1 | 2 | Present invention |
| 80 | 10 mm | 1 | 1 | Present invention |
| 80 | 20 mm | 2 | 1 | Present invention |
| 80 | 25 mm | 3 | 1 | Comparative Example |

As shown in Table 3, in the present invention which satisfies a predetermined amount of ink droplets and the slow distance, it was possible to form excellent lines without occurring head rubbing. In contrast, in Comparative Examples, the line quality significantly deteriorated. In Comparative Examples in which the slow distance was set to less than 5 mm, head rubbing occurred, and in Comparative Examples in which the slow distance was set to over 20 mm, even a predetermined amount of ink droplets was adjusted, the line quality significantly deteriorated.

Example 3

The cyan ink C-1, the magenta ink M-1, the yellow ink Y-1 and the black ink K-1 which were prepared in Example 1 and the inkjet recording device were used, and the images were formed at a resolution (image density) shown in Table 4 described below by increasing or decreasing the number of the used heads of each color. However, 50 dpi (dot per inch) of the image was alternately drawn by half of the nozzles using one inkjet head. As the images, the solid image of 100% four colors (the ratios of each color are C: 20%, M: 20%, Y: 20% and K: 40%) and the solid image of 100% magenta color were formed in the same way as Example 1.

<Conditions>

(i) Transport speed of the nonwoven fabric: 200 m/min (ii) Oxygen partial pressure: adjust to $1\times10^{-2}$ MPa (iii) Distance between the inkjet head and the nonwoven fabric (the stopped state standard; the slow distance): 10 mm (vi) Amount of ink droplets: 80 pl (v) Pinning light source: light up when drawing (Evaluation 3)

As to the images formed using the cyan ink C-1, the magenta ink M-1, the yellow ink Y-1 and the black ink K-1 described above, the following evaluations were conducted. The evaluation results are shown in Table 4 described below.

Here, the evaluation of the periodicity and the amount of the residual monomer was conducted in the same way as Example 1.

(5) Rubfastness

The solid image of 100% four colors was rubbed with cotton which was moist with water, and the rubfastness was evaluated by measuring the difference of the solid image concentration before and after the abrasion test by Gretag Macbeth Spectro Eye manufactured by Gretag Macbeth Co., Ltd. The lower value indicates that the color does not fade and the rubfastness is excellent. If the result falls under 1 or 2 of the following evaluation criteria, then there is no issue with the practical use.

<Evaluation Criteria>

1: The color does not fade at all and the difference of the measured value of the image concentration before and after the abrasion test is less than 0.05.

2: The color is slightly migrated to cotton which was rubbed and the difference of the measured value of the image concentration before and after the abrasion test is 0.05 or more and less than 0.2.

3: The color is largely migrated to cotton which was rubbed and the difference of the measured value of the image concentration before and after the abrasion test is 0.2 or more and less than 0.4.

4: The color fading of the image is visually recognized and the difference of the measured value of the image concentration before and after the abrasion test is 0.4 or more.

(6) Void

As to the solid image of 100% magenta color, the presence or absence of the occurrence of a void was visually observed and the evaluation was conducted according to the following evaluation criteria. If the result falls under 1 or 2 of the following evaluation criteria, then there is no issue with the practical use.

<Evaluation Criteria>

1: The void can not be confirmed by sight.

2: The void can be slightly confirmed by sight.

3: The void can be confirmed by sight.

TABLE 4

| Image density | Odor properties | Amount of residual monomer | Rubfastness | Void | Notes |
|---|---|---|---|---|---|
| 600 dpi × 600 dpi | 2 | 0.1% | 2 | 1 | Present invention |
| 400 dpi × 400 dpi | 2 | 0.01% | 2 | 1 | Present invention |
| 300 dpi × 300 dpi | 2 | 0.01% | 1 | 1 | Present invention |
| 200 dpi × 200 dpi | 1 | Not detected | 1 | 1 | Present invention |
| 100 dpi × 100 dpi | 1 | Not detected | 1 | 2 | Present invention |
| 50 dpi × 50 dpi | 1 | Not detected | 1 | 2 | Present invention |

As shown in Table 4, excellent odor properties, the amount of the residual monomer and the rubfastness were exhibited. Among those, in a case where the image was formed at a resolution of 100 dpi to 400 dpi, the drying load was further suppressed and better odor properties, the amount of the residual monomer and the rubfastness were obtained. The trend was seen in that the resolution of the image became too high, the deterioration in the odor properties, the amount of the residual monomer and the rubfastness easily appeared, and adversely, the resolution of the image became too low, the void of the image easily was observed.

Example 4

In the preparation of the cyan ink C-1, the magenta ink M-1, the yellow ink Y-1 and the black K-1 in Example 1, the cyan ink C-5, the magenta ink M-5, the yellow ink Y-5 and the black ink K-5, or the cyan ink C-6, the magenta ink M-6, the yellow ink Y-6 and the black ink K-6 were prepared in the same way as Example 1 except changing Speedcure 7010 which is a sensitizer to the same quantity of SR341 (3-methyl-1,5-pentanediol diacrylate; polymerizable monomer) or the same quantity of Speedcure ITX (isopropylthioxanthone, manufactured by LAMBSON Ltd., the molecular weight: 254) and the images were formed under the following conditions.

Furthermore, in the preparation of the cyan ink C-1, the magenta ink M-1, the yellow ink Y-1 and the black K-1 in Example 1, the cyan ink C-7, the magenta ink M-7, the yellow ink Y-7 and the black ink K-7 were prepared in the same way as Example 1 except changing Speedcure 7010 which is a sensitizer to the same quantity of the compound I-F described below (n=20, the molecular weight: 1934; the sensitizer represented by the general formula (2)), and the images were formed under the following conditions.

In addition, in the preparation of the cyan ink C-1, the magenta ink M-1, the yellow ink Y-1 and the black K-1 in Example 1, the cyan ink C-8, the magenta ink M-8, the yellow ink Y-8 and the black ink K-8 were prepared in the same way as Example 1 except changing Speedcure 7010 which is a sensitizer to the same quantity of the compound I-I described below (k=20, l=20, m=20, the molecular weight: 4328; the sensitizer represented by the general formula (2)), and the images were formed under the following conditions.

[Chem. 23]

I-F

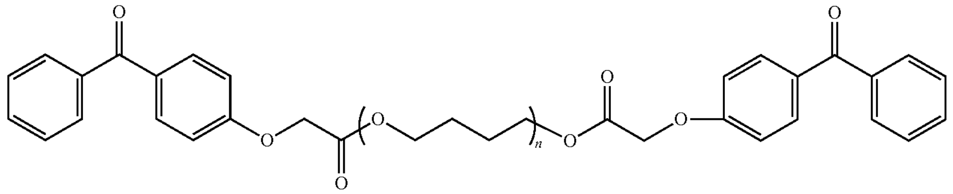

n = 20

I-I

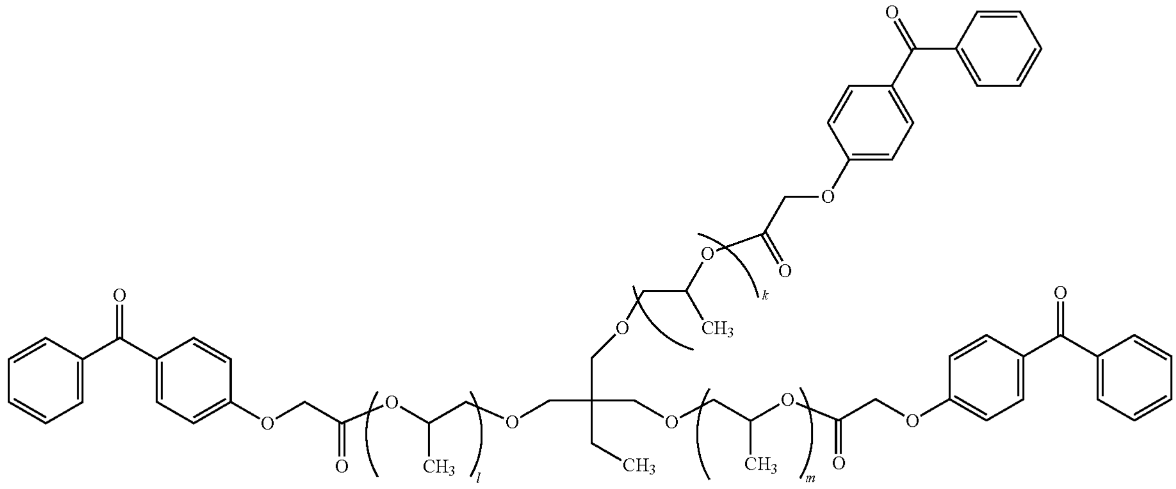

k = 20
l = 20
m = 20

Here, as the images, the solid image of 100% four colors (The ratios of each color are C: 20%, M: 20%, Y: 20% and K: 40%) and the solid image of 100% magenta color were formed in the same way as Example 1.

<Conditions>

(i) Transport speed of the nonwoven fabric: 200 m/min
(ii) Oxygen partial pressure: adjust to $1\times10^{-2}$ MPa
(iii) Distance between the inkjet head and the nonwoven fabric (the stopped state criteria; the slow distance): 10 mm
(vi) Amount of ink droplets: 80 pl
(v) Resolution of the image: 200 dpi×200 dpi
(vi) Pinning light source: light up when drawing (Evaluation 4)

As to the images formed using the cyan inks C-5 to C-8, the magenta inks M-5 to M-8, the yellow inks Y-5 to Y-8 and the black inks K-5 to K-8 described above, the following evaluations were conducted. The evaluation results are shown in Table 5 described below. Here, the evaluation of the odor properties, the amount of the residual monomer and the rub-fastness was conducted in the same way as Example 1.

TABLE 5

| Kind of ink | Odor properties | Amount of residual monomer [mass ratio] | Rub-fastness | Other | Notes |
|---|---|---|---|---|---|
| C-5/M-5/Y-5/K-5 | 4 | 5% | 4 | — | Comparative Example |
| C-6/M-6/Y-6/K-6 | 1 | Not detected | 1 | The overflow of ITX is present. | Comparative Example |
| C-1/M-1/Y-1/K-1 | 1 | Not detected | 1 | — | Present invention |
| C-7/M-7/Y-7/K-7 | 1 | Not detected | 1 | — | Present invention |
| C-8/M-8/Y-8/K-8 | 1 | Not detected | 1 | — | Present invention |

As shown in Table 5, in the present invention in which the sensitizer having high molecular weight was used, the odor properties, the amount of the residual monomer and the rubfastness were excellent. In contrast, in Comparative Examples in which the sensitizer was not added, the odor properties, the amount of the residual monomer and rubfastness deteriorated. In addition, in Comparative Examples in which the sensitizer having low molecular weight was used, the outflow of sensitizer was observed while the residual monomer was not detected.

Example 5

The cyan ink C-1, the magenta ink M-1, the yellow ink Y-1 and the black ink K-1 which were prepared in Example 1 and the inkjet recording device were used, and the image was formed by lighting or not lighting the pinning light source. As the images, the solid image of 100% four colors (the ratios of each color are C: 20%, M: 20%, Y: 20% and K: 40%) and the solid image of 100% magenta color were formed in the same way as Example 1.

<Conditions>

(i) Transport speed of the nonwoven fabric: 200 m/min (ii) Oxygen partial pressure: adjust to $1\times10^{-2}$ MPa (iii) Distance between the inkjet head and the nonwoven fabric (the stopped state criteria; the slow distance): 10 mm (vi) Amount of ink droplets: 80 pl (v) Resolution of the image: 200 dpi×200 dpi (Evaluation 5)

As to the images formed using the cyan ink C-1, the magenta ink M-1, the yellow ink Y-1 and the black ink K-1 which were prepared in Example 1 and the inkjet recording device, the color bleeding was evaluated by the following method. The evaluation results are shown in Table 6 described below.

(7) Color Bleeding

The solid image of 100% black color was formed right beside the solid image of 100% yellow color, the presence or absence of the occurrence of color bleeding is visually observed, and the evaluation was conducted according to the following evaluation criteria. If the result falls under 1 or 2 of the following evaluation criteria, then there is no issue with the practical use.

<Evaluation Criteria>

1: Black is not mixed in the yellow drawing part at all.

2: A slight amount of black is mixed in the yellow drawing part.

3: A large amount of black is mixed in the yellow drawing part.

TABLE 6

| Pinning light source | Color bleeding | Notes |
|---|---|---|
| Lighted | 1 | Present invention |
| Not lighted | 2 | Present invention |

As shown in Table 6, in a case where the pinning exposure was conducted, the color bleeding in the image did not occur at all. In contrast, in a case where the pinning exposure was not conducted, the color bleeding slightly occurred.

What is claimed is:

1. An inkjet recording method comprising:

an image forming step of forming an image by imparting an actinic ray curable ink composition containing a pigment, a polyfunctional polymerizable compound in which a content ratio to a total polymerization component is 80% by mass or more and a sensitizer in which a molecular weight is 1,000 or more onto a recording substrate which is an aggregate of a nonabsorbable or a low absorbable fiber material from an inkjet head under the conditions in which an amount of ink droplets is from 25 pl to 200 pl and a distance between the recording substrate and the inkjet head is from 5 mm to 20 mm; and a curing step of curing the image by irradiating the formed image with an actinic ray under the conditions in which an oxygen partial pressure is $1.5\times10^{-2}$ MPa or less.

2. The inkjet recording method according to claim 1, wherein in the image forming step, the actinic ray curable ink composition is imparted at a resolution from 50 dpi to 400 dpi.

3. The inkjet recording method according to claim 1, wherein in the image forming step, the image is formed onto the recording substrate which is transported at a transport speed of 50 m/min or more.

4. The inkjet recording method according to claim 2, wherein in the image forming step, the image is formed onto the recording substrate which is transported at a transport speed of 50 m/min or more.

5. The inkjet recording method according to claim 1, wherein the fiber material is a polymer fiber.

6. The inkjet recording method according to claim 1, wherein the polyfunctional polymerizable compound is a compound having at least two or more radical polymerizable unsaturated double bonds.

7. The inkjet recording method according to claim 1, wherein the amount of ink droplets of the actinic ray curable ink composition is 75 pl or more.

8. The inkjet recording method according to claim 1, wherein the resolution is from 50 dpi to 300 dpi.

9. The inkjet recording method according to claim 1, wherein the image forming step includes a pre-curing step of pre-curing a first actinic ray curable ink composition, after a first actinic ray curable ink composition is imparted onto the recording substrate and before a second actinic ray curable ink composition is imparted by using the actinic ray curable ink composition of two or more colors.

10. An inkjet recording device comprising:

an inkjet head which discharges an actinic ray curable ink composition containing a pigment, a polyfunctional polymerizable compound in which a content ratio to a total polymerization component is 80% by mass or more and a sensitizer in which a molecular weight is 1,000 or more with an amount of ink droplets from 25 pl to 200 pl;

a transporting means for transporting a recording substrate with a long shape which is an aggregate of a nonabsorbable or a low absorbable fiber material while a distance between the recording substrate and the inkjet head is set to from 5 mm to 20 mm; and first irradiating means for irradiating with respect to an image which is formed by the actinic ray curable ink composition which is discharged from the inkjet head with an actinic ray under the conditions in which an oxygen partial pressure is $1.5\times10^{-2}$ MPa or less.

11. The inkjet recording device according to claim 10, wherein the inkjet head discharges the actinic ray curable ink composition with the amount of ink droplets of 75 pl or more.

12. The inkjet recording device according to claim 10, wherein the inkjet head has a plurality of nozzles which are arranged with the nozzle density from 50 npi to 400 npi.

13. The inkjet recording device according to claim 10, wherein the inkjet head has a plurality of nozzles which are arranged with the nozzle density from 50 npi to 300 npi.

14. The inkjet recording device according to claim 10, comprising:

two or more inkjet heads; and second irradiating means for pre-curing the actinic ray curable ink composition between the two adjacent inkjet heads.

15. The inkjet recording device according to claim 10, wherein first irradiating means includes inert gas supplying means for supplying an inert gas and an irradiation chamber in which the oxygen partial pressure is adjusted at $1.5\times10^{-2}$ MPa or less by the inert gas which is supplied from inert gas supplying means and to which the recording substrate is transported.

* * * * *